United States Patent
Sasaki et al.

(10) Patent No.: US 7,843,665 B2
(45) Date of Patent: Nov. 30, 2010

(54) PERPENDICULAR MAGNETIC RECORDING HEAD WITH NONMAGNETIC METAL LAYER EVEN WITH TOP FACE OF POLE LAYER

(75) Inventors: Yoshitaka Sasaki, Milpitas, CA (US); Hiroyuki Itoh, Milpitas, CA (US); Takehiro Horinaka, Milpitas, CA (US); Hironori Araki, Milpitas, CA (US); Tatsushi Shimizu, Hong Kong (CN); Tatsuya Shimizu, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 966 days.

(21) Appl. No.: 11/518,210

(22) Filed: Sep. 11, 2006

(65) Prior Publication Data
US 2008/0068747 A1 Mar. 20, 2008

(51) Int. Cl.
*G11B 5/31* (2006.01)
(52) U.S. Cl. .............................. 360/125.03; 360/125.3; 29/603.15
(58) Field of Classification Search ............ 360/125.02, 360/125.3, 128, 125.27, 125.28, 125.29, 360/125.67, 125.68, 125.69, 125.7, 125.03; 29/603.15
See application file for complete search history.

(56) References Cited

U.S. PATENT DOCUMENTS

| 4,656,546 | A | 4/1987 | Mallory |
| 4,672,493 | A | 6/1987 | Schewe |
| 6,504,675 | B1 | 1/2003 | Shukh et al. |
| 2003/0151850 | A1 | 8/2003 | Nakamura et al. |
| 2005/0068678 | A1* | 3/2005 | Hsu et al. ............... 360/126 |
| 2006/0002014 | A1* | 1/2006 | Sasaki et al. ............ 360/125 |
| 2006/0198049 | A1* | 9/2006 | Sasaki et al. ............ 360/126 |
| 2006/0268456 | A1* | 11/2006 | Sasaki et al. ............ 360/126 |

FOREIGN PATENT DOCUMENTS

JP A 2003-242607 8/2003

OTHER PUBLICATIONS

U.S. Appl. No. 11/213,863; Aug. 30, 2005; Sasaki et al.

* cited by examiner

*Primary Examiner*—Craig A. Renner
*Assistant Examiner*—Tamara Ashford
(74) *Attorney, Agent, or Firm*—Oliff & Berridge, PLC

(57) ABSTRACT

A magnetic head including an encasing layer having a groove; a nonmagnetic metal layer that has a sidewall located directly above the edge of the groove and that is disposed on a region of the encasing layer away from the medium facing surface; two side shield layers that have sidewalls located directly above the edge of the groove and that are disposed adjacent to the nonmagnetic metal layer on regions of the encasing layer closer to the medium facing surface than the nonmagnetic metal layer; and a pole layer. The pole layer is placed in an encasing section formed of the groove of the encasing layer, the sidewall of the nonmagnetic metal layer, and the sidewalls of the two side shield layers.

22 Claims, 24 Drawing Sheets

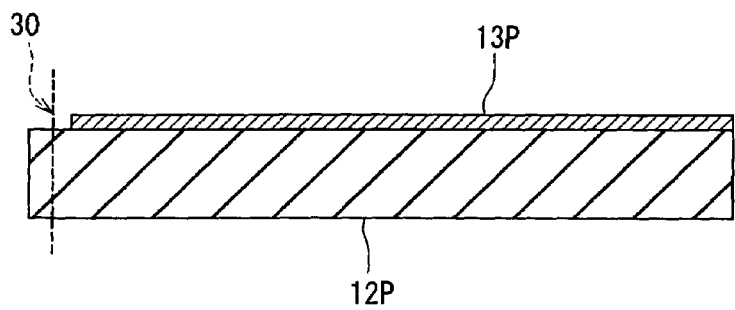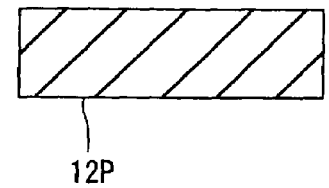
FIG. 8A　　　　　　　　　　　FIG. 8B
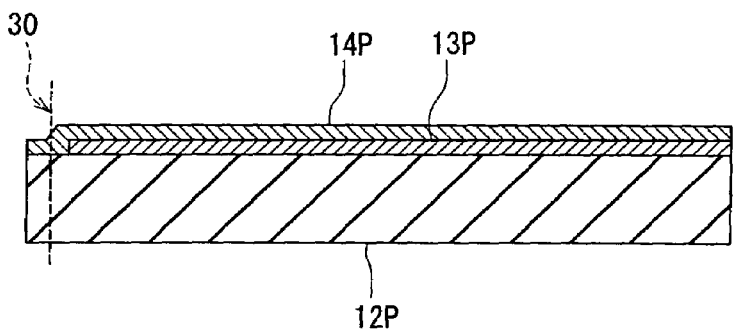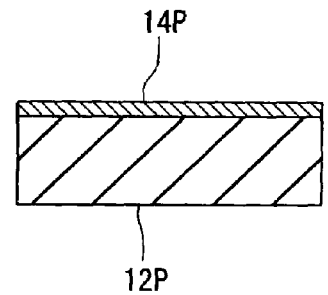
FIG. 9A　　　　　　　　　　　FIG. 9B

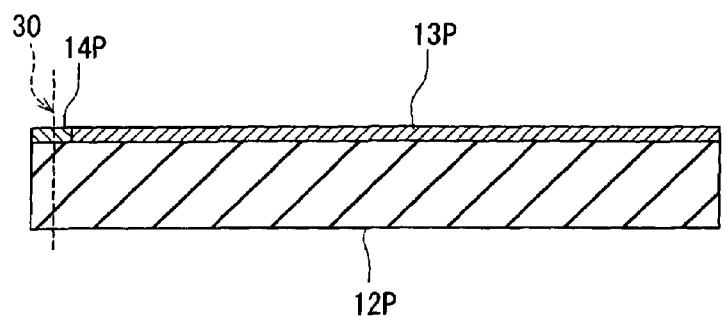
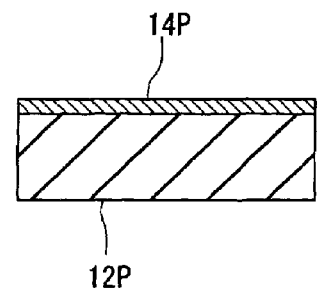
FIG. 11A  FIG. 11B
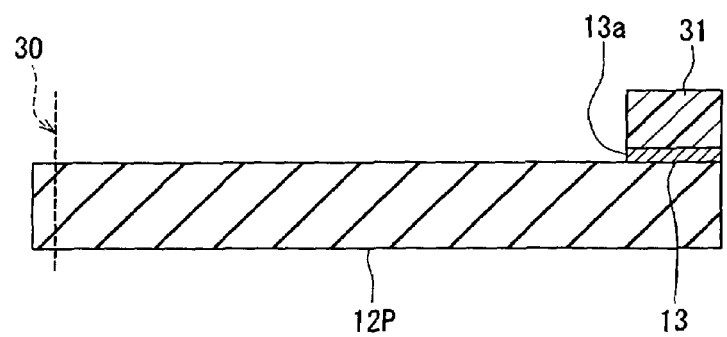
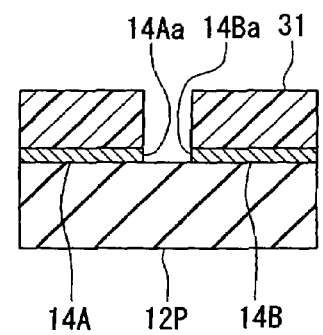
FIG. 12A  FIG. 12B

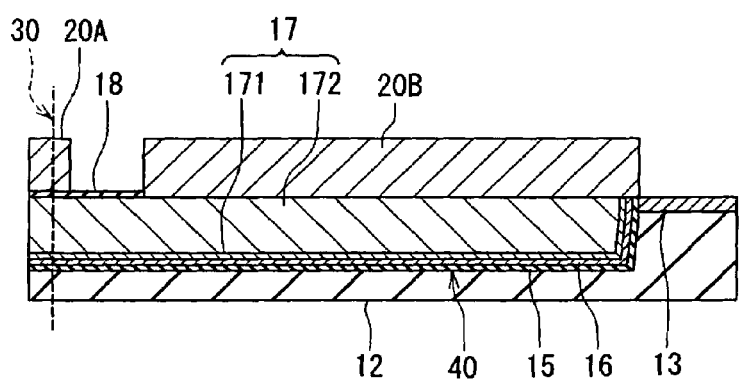
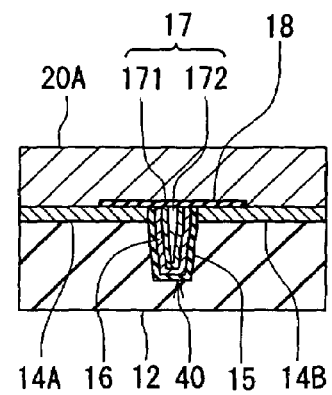
FIG. 19A　　　　　　　　FIG. 19B
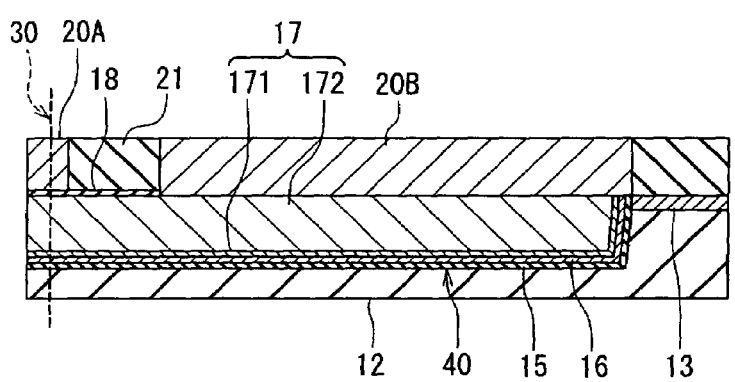
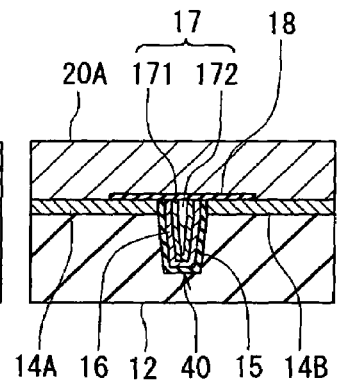
FIG. 20A　　　　　　　　FIG. 20B

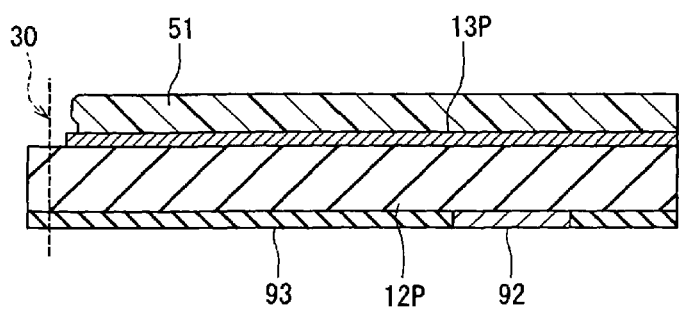
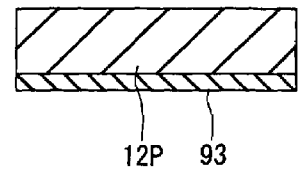
FIG. 30A  FIG. 30B
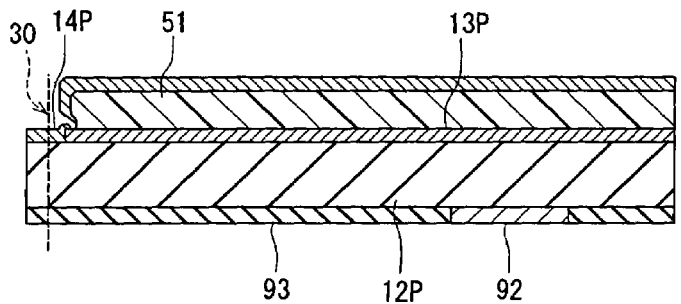
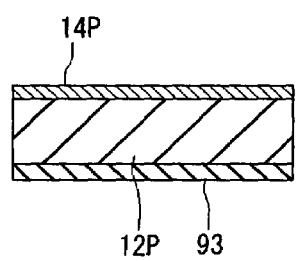
FIG. 31A  FIG. 31B
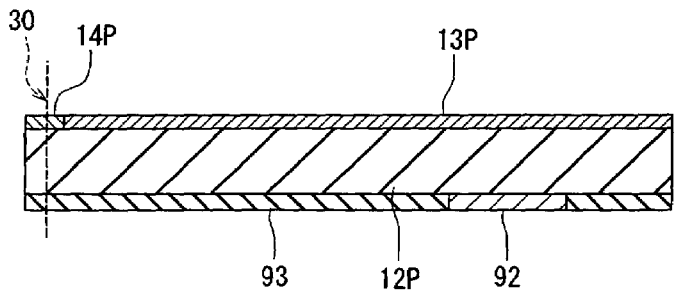
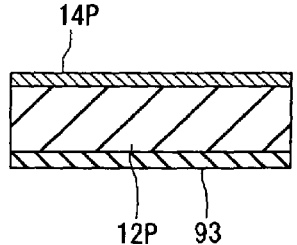
FIG. 32A  FIG. 32B

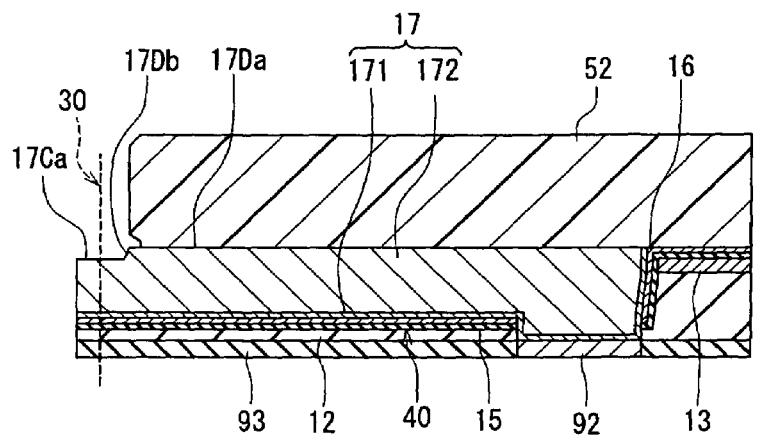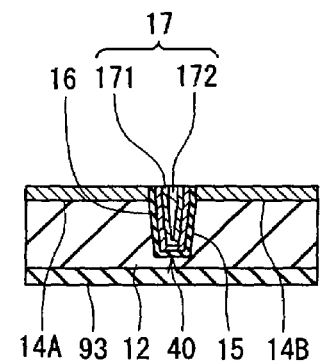
FIG. 37A    FIG. 37B
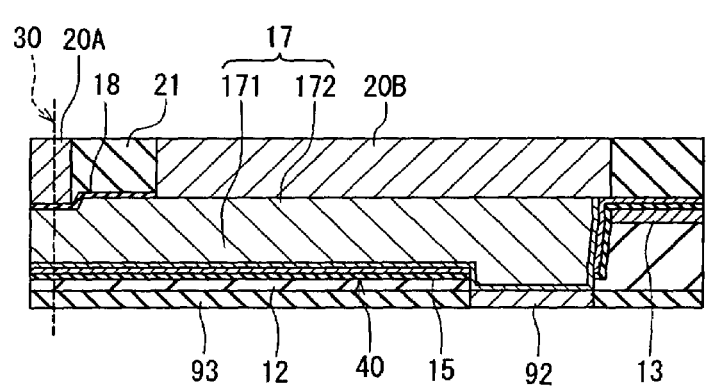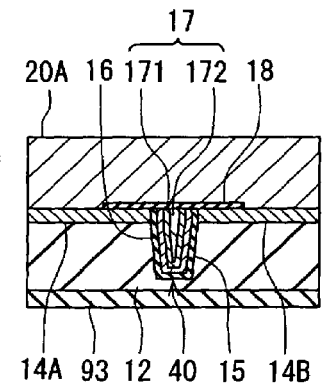
FIG. 38A    FIG. 38B

PERPENDICULAR MAGNETIC RECORDING HEAD WITH NONMAGNETIC METAL LAYER EVEN WITH TOP FACE OF POLE LAYER

BACKGROUND OF THE INVENTION

1. Field of the Invention

The present invention relates to a magnetic head for perpendicular magnetic recording that is used for writing data on a recording medium by means of a perpendicular magnetic recording system and to a method of manufacturing such a magnetic head.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared with the longitudinal magnetic recording system.

Like magnetic heads for longitudinal magnetic recording, magnetic heads for perpendicular magnetic recording typically used have a structure in which a reproducing (read) head having a magnetoresistive element (that may be hereinafter called an MR element) for reading and a recording (write) head having an induction-type electromagnetic transducer for writing are stacked on a substrate. The write head comprises a magnetic pole layer that produces a magnetic field in the direction orthogonal to the surface of the recording medium. The pole layer incorporates a track width defining portion and a wide portion, for example. The track width defining portion has an end located in a medium facing surface that faces toward the recording medium. The wide portion is coupled to the other end of the track width defining portion and has a width greater than the width of the track width defining portion. The track width defining portion has a nearly uniform width.

For the perpendicular magnetic recording system, it is an improvement in recording medium and an improvement in write head that mainly contributes to an improvement in recording density. It is a reduction in track width and an improvement in writing characteristics that is particularly required for the write head to achieve higher recording density. On the other hand, if the track width is reduced, the writing characteristics, such as an overwrite property that is a parameter indicating an overwriting capability, suffer degradation. It is therefore required to achieve better writing characteristics as the track width is reduced. Here, the length of the track width defining portion orthogonal to the medium facing surface is called a neck height. The smaller the neck height, the better is the overwrite property.

A magnetic head used for a magnetic disk drive such as a hard disk drive is typically provided in a slider. The slider has the medium facing surface mentioned above. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt of the magnetic head with respect to the tangent of the circular track, which is called a skew, occurs according to the position of the magnetic head across the tracks.

In a magnetic disk drive of the perpendicular magnetic recording system that exhibits a better capability of writing on a recording medium than the longitudinal magnetic recording system, in particular, if the above-mentioned skew occurs, problems are encountered, such as an occurrence of a phenomenon in which data stored on an adjacent track is erased when data is written on a specific track (that is hereinafter called adjacent track erase), or unwanted writing between adjacent two tracks. To achieve higher recording density, it is required to suppress adjacent track erase. Unwanted writing between adjacent two tracks affects detection of servo signals for alignment of the magnetic head and the signal-to-noise ratio of a read signal.

A technique is known for preventing the above-described problems resulting from the skew, as disclosed in U.S. Patent Application Publication No. US 2003/0151850A1 and U.S. Pat. No. 6,504,675B1, for example. According to this technique, the end face of the track width defining portion located in the medium facing surface is made to have a shape in which the side located backward in the direction of travel of the recording medium (that is, the side located closer to the air inflow end of the slider) is shorter than the opposite side. Typically, in the medium facing surface of a magnetic head, the end farther from the substrate is located forward in the direction of travel of the recording medium (that is, located closer to the air outflow end of the slider). Therefore, the above-mentioned shape of the end face of the track width defining portion located in the medium facing surface is such that the side closer to the substrate is shorter than the side farther from the substrate.

As a magnetic head for perpendicular magnetic recording, a magnetic head comprising a pole layer and a shield is known, as disclosed in U.S. Pat. No. 4,656,546, for example. In the medium facing surface of this magnetic head, an end face of the shield is located forward of an end face of the pole layer along the direction of travel of the recording medium with a specific small space therebetween. Such a magnetic head will be hereinafter called a shield-type head. In the shield-type head, the shield has a function of preventing a magnetic flux from reaching the recording medium, the flux being generated from the end face of the pole layer and extending in directions except the direction orthogonal to the surface of the recording medium. The shield also has a function of returning a magnetic flux that has been generated from the end face of the pole layer and that has magnetized the recording medium. The shield-type head achieves a further improvement in linear recording density.

U.S. Pat. No. 4,672,493 discloses a magnetic head having a structure in which magnetic layers are provided forward and backward, respectively, in the direction of travel of the recording medium with respect to a middle magnetic layer to be the pole layer, and coils are disposed between the middle magnetic layer and the forward magnetic layer, and between the middle magnetic layer and the backward magnetic layer, respectively. This magnetic head is capable of increasing components orthogonal to the surface of the recording medium among components of the magnetic field generated from the medium-facing-surface-side end of the middle magnetic layer.

Consideration will now be given to a method of forming the pole layer in which the end face of the track width defining portion located in the medium facing surface has a shape in which the side closer to the substrate is shorter than the side farther from the substrate as described above. It is frame plating that has been often used in prior art for forming such a pole layer. In a method of forming the pole layer by frame plating, an electrode film is first formed on a base of the pole layer. Next, a photoresist layer is formed on the electrode film. The photoresist layer is then patterned to form a frame having a groove whose shape corresponds to the pole layer. Next, plating is performed by feeding a current to the electrode film to form the pole layer in the groove. The frame is then removed. Next, the electrode film except a portion thereof located below the pole layer is removed. Next, an insulating layer made of alumina, for example, is formed to cover the pole layer. Next, the insulating layer and the pole layer are polished by chemical mechanical polishing (hereinafter referred to as CMP), for example. Through the polishing, the top surface of the pole layer is flattened, and the thickness of the pole layer is controlled to be of a desired value.

The foregoing method of forming the pole layer has a problem that, if the polishing is stopped at a level other than a desired level, the thickness of the pole layer is made other than a desired thickness and the track width defined by the length of the above-mentioned side farther from the substrate is thereby made other than a desired value.

U.S. Patent Application Publication No. US 2003/0151850A1 discloses a technique in which the end face of the track width defining portion in the medium facing surface is shaped to have a first portion and a second portion. The first portion continuously increases in width from an end thereof located on the air-inflow-end side toward the other end located on the air-outflow-end side. The second portion is located on the air-outflow-end side of the first portion and has a uniform width that is equal to the width of the end of the first portion on the air-outflow-end side. This technique is capable of reducing variations in track width.

However, the technique disclosed in this publication has the following problem. According to the technique, the pole layer is encased in a groove formed in an inorganic insulating film. The groove is formed by etching, and has a tapered portion and a portion having an inner wall orthogonal to the top surface of the inorganic insulating film. However, it is not easy to form the groove having these two portions in the inorganic insulating film by etching. U.S. Patent Application Publication No. US 2003/0151850A1 discloses that the two portions are formed by changing conditions for etching.

According to the technique disclosed in this publication, the top surfaces of the pole layer and the inorganic insulating film are flattened by CMP or etching. However, the rate at which polishing by CMP proceeds and the etching rate are different between the magnetic metal material making the pole layer and the inorganic insulating material making the inorganic insulating film. Typically, the rate at which polishing proceeds or the etching rate of the magnetic metal material is higher than that of the inorganic insulating material under the conditions suitable for polishing or etching of the magnetic metal material. Therefore, according to the technique disclosed in the above-mentioned publication, even though an attempt is made to flatten the top surfaces of the pole layer and the inorganic insulating film by CMP or etching, it is likely in practice that the top surface of the pole layer is made recessed more deeply than the top surface of the inorganic insulating film. It is therefore difficult to form the pole layer having a desired shape through this technique.

The above-mentioned publication also discloses a method of forming the pole layer as will now be described. In the method, first, a first magnetic film is formed on the inorganic insulating film and in the groove formed in the inorganic insulating film. Next, the first magnetic film is removed by CMP or etching, so that the top surface of the first magnetic film is recessed more deeply than the top surface of the inorganic insulating film. Next, a second magnetic film is formed on the first magnetic film and the inorganic insulating film. The top surface of the second magnetic film is then flattened to form the pole layer made up of the first and second magnetic films. However, this method has a problem that the number of steps is increased.

Reference is now made to FIG. 39 to describe a basic configuration of the shield-type head. FIG. 39 is a front view of a portion of the medium facing surface of an example of the shield-type head. The shield-type head comprises: the medium facing surface that faces toward a recording medium; a coil (not shown) for generating a magnetic field corresponding to data to be written on the medium; a pole layer 316 having an end face located in the medium facing surface, allowing a magnetic flux corresponding to the field generated by the coil to pass, and generating a write magnetic field for writing the data on the medium by means of the perpendicular magnetic recording system; a shield layer 320 having an end face located in the medium facing surface and having a portion located away from the medium facing surface and coupled to the pole layer 316; and a gap layer 318 provided between the pole layer 316 and the shield layer 320. In this example the pole layer 316 is disposed on an insulating layer 314. An insulating layer 317 is provided around the pole layer 316. The pole layer 316 and the insulating layer 317 have flattened top surfaces on which the gap layer 318 is disposed. The shield layer 320 is further disposed on the gap layer 318.

The end face of the pole layer 316 located in the medium facing surface has a shape of trapezoid in which the side closer to the gap layer 318 is longer than the opposite side.

Problems of the shield-type heads such as the one shown in FIG. 39 will now be described. In FIG. 39 the physical track width PTW is determined by the width of a portion of the end face of the pole layer 316 located in the medium facing surface, the portion being in contact with the gap layer 318. However, a magnetic flux 321 starting from the pole layer 316 across the gap layer 318 and reaching the shield layer 320 extends wider than the physical track width PTW. Consequently, the effective track width ETW is greater than the physical track width PTW. For example, if the physical track width PTW is 0.12 micrometer (μm), the thickness of the pole layer 316 is 0.3 μm, and the thickness of the gap layer 318 is 50 nanometers (nm), the effective track width ETW is greater than the physical track width PTW by no less than 0.08 to 0.12 μm, according to conventional devices.

If the effective track width ETW is much greater than the physical track width PTW as described above, problems arises, such as adjacent track erase and unwanted writing performed between adjacent two tracks. If the physical track width PTW is reduced to reduce the effective track width ETW, such problems arise that it is difficult to control the physical track width PTW and that the overwrite property suffers degradation.

If the thickness of the gap layer 318 is reduced, it is possible to suppress expansion in the direction of track width of the magnetic flux starting from the pole layer 316 across the gap layer 318 and reaching the shield layer 320. In this case, however, there arises the problem that the overwrite property suffers degradation.

OBJECT AND SUMMARY OF THE INVENTION

It is an object of the invention to provide a magnetic head for perpendicular magnetic recording having a structure in which a pole layer and a shield layer are opposed to each other with a gap layer disposed in between, the magnetic head allowing the pole layer having a desired shape to be formed with accuracy and being capable of reducing the difference between the physical track width and the effective track width, and to provide a method of manufacturing such a magnetic head.

A magnetic head for perpendicular magnetic recording of the invention comprises: a medium facing surface that faces toward a recording medium; a coil for generating a magnetic field corresponding to data to be written on the recording medium; a pole layer having an end face located in the medium facing surface, allowing a magnetic flux corresponding to the field generated by the coil to pass therethrough, and generating a write magnetic field for writing the data on the recording medium by means of a perpendicular magnetic recording system; a main shield layer made of a magnetic material, having an end face disposed in the medium facing surface at a location forward of the end face of the pole layer along a direction of travel of the recording medium, and having a portion that is away from the medium facing surface and coupled to the pole layer; a gap layer made of a nonmagnetic material, provided between the pole layer and the main shield layer, and having an end face disposed in the medium facing surface; an encasing layer made of a nonmagnetic material and having a groove that opens in a top surface thereof; a nonmagnetic metal layer made of a nonmagnetic metal material that has a sidewall located directly above an edge of the groove and that is disposed on a region of a top surface of the encasing layer away from the medium facing surface; two side shield layers made of a magnetic metal material that have sidewalls located directly above the edge of the groove and that are disposed adjacent to the nonmagnetic metal layer on regions of the top surface of the encasing layer closer to the medium facing surface than the nonmagnetic metal layer; an encasing section that is formed of the groove, the sidewall of the nonmagnetic metal layer, and the sidewalls of the side shield layers and that accommodates at least part of the pole layer; and a nonmagnetic film made of a nonmagnetic material and disposed between the pole layer and the sidewalls of the side shield layers. The two side shield layers have two end faces located in the medium facing surface on both sides of the end face of the pole layer, the sides being opposed to each other in a direction of track width.

According to the magnetic head for perpendicular magnetic recording of the invention, the side shield layers make it possible to suppress a magnetic flux extending in the direction of track width, the flux starting from the pole layer across the gap layer and reaching the main shield layer.

In the magnetic head of the invention, the end face of the pole layer located in the medium facing surface may include a portion having a width that decreases as the distance from the gap layer increases.

In the magnetic head of the invention, the end face of the pole layer located in the medium facing surface may incorporate a first region and a second region disposed between the first region and the end face of the gap layer and connected to the first region. In this case, the first region has a width that decreases as the distance from the gap layer increases. The second region has a uniform width that defines the track width. The width of the first region and that of the second region are equal at the boundary between the first and second regions. In the medium facing surface, the end faces of the side shield layers are located on both sides of the second region, the sides being opposed to each other in the direction of track width.

In the magnetic head of the invention, in the medium facing surface, both ends of the end face of the gap layer opposed to each other in the direction of track width may be located at positions outside the sidewalls of the side shield layers along the direction of track width.

In the magnetic head of the invention, the side shield layers may have a saturation flux density lower than that of the pole layer.

In the magnetic head of the invention, the side shield layers may be connected to the main shield layer. Alternatively, it is possible that the side shield layers are not connected to the main shield layer.

The magnetic head of the invention may further comprise a substrate on which the encasing layer, the nonmagnetic metal layer, the side shield layers, the nonmagnetic film, the pole layer, the gap layer, the main shield layer, and the coil are stacked. In this case, the pole layer may incorporate: a first portion having the end face located in the medium facing surface; and a second portion located farther from the medium facing surface than the first portion and having a thickness greater than that of the first portion. In addition, a surface of the first portion farther from the substrate may be located closer to the substrate than a surface of the second portion farther from the substrate.

A method of manufacturing the magnetic head for perpendicular magnetic recording of the invention comprises the steps of: forming a nonmagnetic layer that will be the encasing layer later by forming the groove therein; forming a nonmagnetic metal film that will be the nonmagnetic metal layer later on a portion of a top surface of the nonmagnetic layer; forming a magnetic film that will be the two side shield layers later on portions of the top surface of the nonmagnetic layer where the nonmagnetic metal film is not formed, the step of forming the magnetic film being performed after the step of forming the nonmagnetic metal film; flattening top surfaces of the nonmagnetic metal film and the magnetic film; selectively etching the nonmagnetic metal film and the magnetic film so that the nonmagnetic metal film is formed into the nonmagnetic metal layer and the magnetic film is formed into the two side shield layers; selectively etching the nonmagnetic layer using the nonmagnetic metal layer and the side shield layers as masks, so that the groove is formed in the nonmagnetic layer and the nonmagnetic layer is thereby formed into the encasing layer, and so that the encasing section is formed of the groove, the sidewall of the nonmagnetic metal layer and the sidewalls of the side shield layers; forming the nonmagnetic film after the step of selectively etching the nonmagnetic layer; forming the pole layer so that the at least part of the pole layer is placed in the encasing section and that the nonmagnetic film is disposed between the pole layer and the sidewalls of the side shield layers; forming the gap layer on the pole layer; forming the main shield layer on the gap layer; and forming the coil.

In the method of manufacturing the magnetic head of the invention, in the step of flattening the top surfaces of the nonmagnetic metal film and the magnetic film, the top surface of the magnetic film may be polished such that the top surface of the nonmagnetic metal film is a level at which the polishing is stopped. In this case, the polishing may be chemical mechanical polishing.

In the method of the invention, in the step of forming the magnetic film, the magnetic film may be formed on a top surface of the nonmagnetic metal film and a portion of the top surface of the nonmagnetic layer where the nonmagnetic metal film is not formed.

In the method of the invention, the step of forming the nonmagnetic metal film may include the steps of: forming a film to be patterned that will be patterned later to be the nonmagnetic metal film; forming an etching mask on the film to be patterned; and selectively etching the film to be patterned using the etching mask, so that the film to be patterned is formed into the nonmagnetic metal film. In this case, the step of forming the magnetic film may include the steps of forming the magnetic film while leaving the etching mask unremoved; and removing the etching mask after the magnetic film is formed.

In the method of the invention, in the step of forming the nonmagnetic film, the nonmagnetic film may be formed such that the nonmagnetic film is disposed between the pole layer and each of the encasing layer, the nonmagnetic metal layer and the side shield layers. In this case, the nonmagnetic film may be formed by chemical vapor deposition in which formation of a single atomic layer is repeated.

In the method of the invention, the end face of the pole layer located in the medium facing surface may include a portion having a width that decreases as the distance from the gap layer increases.

In the method of the invention, the end face of the pole layer located in the medium facing surface may incorporate a first region and a second region disposed between the first region and the end face of the gap layer and connected to the first region. In this case, the first region has a width that decreases as the distance from the gap layer increases. The second region has a uniform width that defines the track width. The width of the first region and that of the second region are equal at the boundary between the first and second regions. In addition, in the medium facing surface, the end faces of the side shield layers are located on both sides of the second region, the sides being opposed to each other in the direction of track width.

In the method of the invention, in the medium facing surface, both ends of the end face of the gap layer opposed to each other in the direction of track width may be located at positions outside the sidewalls of the side shield layers along the direction of track width.

In the method of the invention, the side shield layers may have a saturation flux density lower than that of the pole layer.

In the method of the invention, the side shield layers may be connected to the main shield layer. Alternatively, it is possible that the side shield layers are not connected to the main shield layer.

The magnetic head manufactured through the method of the invention may further comprise a substrate on which the encasing layer, the nonmagnetic metal layer, the side shield layers, the nonmagnetic film, the pole layer, the gap layer, the main shield layer and the coil are stacked. In this case, the pole layer may incorporate: a first portion having the end face located in the medium facing surface; and a second portion located farther from the medium facing surface than the first portion and having a thickness greater than that of the first portion. In addition, a surface of the first portion farther from the substrate may be located closer to the substrate than a surface of the second portion farther from the substrate.

According to the magnetic head for perpendicular magnetic recording of the invention or the method of manufacturing the same, it is possible to easily form the encasing section and to precisely form the pole layer at least part of which is placed in the encasing section. As a result, according to the invention, it is possible to form a pole layer having a desired shape with accuracy. Furthermore, according to the invention, the side shield layers make it possible to suppress a magnetic flux extending in the direction of track width, the flux starting from the pole layer across the gap layer and reaching the main shield layer. It is thereby possible to reduce the difference between the physical track width and the effective track width.

Other and further objects, features and advantages of the invention will appear more fully from the following description.

BRIEF DESCRIPTION OF THE DRAWINGS

FIG. 8A and FIG. 8B are cross-sectional views of the layered structure shown in FIG. 7.

FIG. 9A and FIG. 9B are cross-sectional views of the layered structure obtained in a step that follows the step shown in FIG. 8A and FIG. 8B.

FIG. 11A and FIG. 11B are cross-sectional views of the layered structure shown in FIG. 10.

FIG. 12A and FIG. 12B are cross-sectional views of the layered structure obtained in a step that follows the step shown in FIG. 11A and FIG. 11B.

FIG. 19A and FIG. 19B are cross-sectional views of the layered structure shown in FIG. 18.

FIG. 20A and FIG. 20B are cross-sectional views of the layered structure obtained in a step that follows the step shown in FIG. 19A and FIG. 19B.

FIG. 30A and FIG. 30B are cross-sectional views of the layered structure obtained in a step that follows the step shown in FIG. 29A and FIG. 29B.

FIG. 31A and FIG. 31B are cross-sectional views of the layered structure obtained in a step that follows the step shown in FIG. 30A and FIG. 30B.

FIG. 32A and FIG. 32B are cross-sectional views of the layered structure obtained in a step that follows the step shown in FIG. 31A and FIG. 31B.

FIG. 37A and FIG. 37B are cross-sectional views of the layered structure shown in FIG. 36.

FIG. 38A and FIG. 38B are cross-sectional views of the layered structure obtained in a step that follows the step shown in FIG. 37A and FIG. 37B.

DETAILED DESCRIPTION OF THE PREFERRED EMBODIMENTS

First Embodiment

Figure 5:
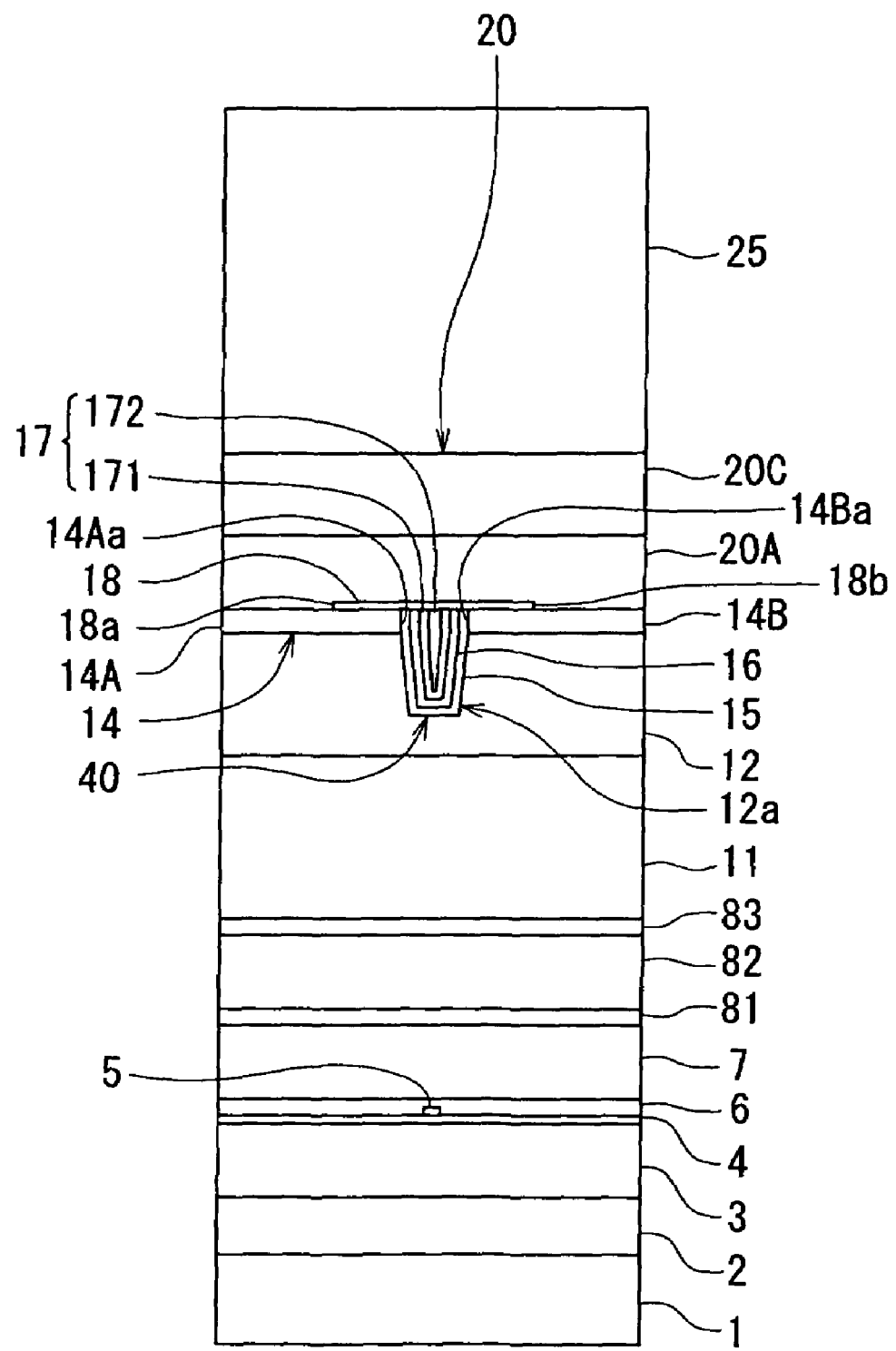
FIG. 5 is a front view of the medium facing surface of the magnetic head of the first embodiment of the invention.
Figure 6:
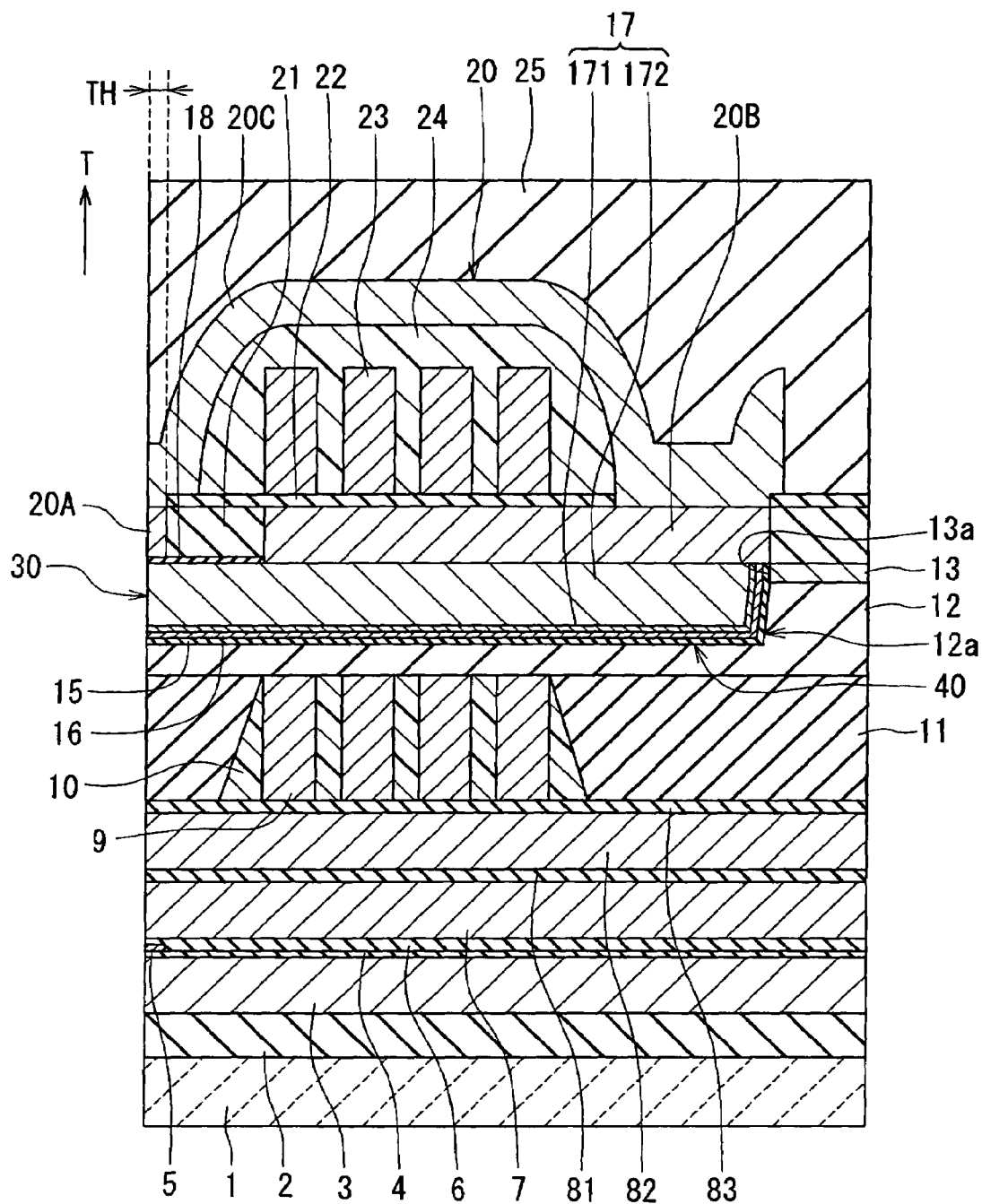
FIG. 6 is a cross-sectional view for illustrating the configuration of the magnetic head of the first embodiment of the invention.

Preferred embodiments of the invention will now be described in detail with reference to the accompanying drawings. Reference is now made to FIG. 5 and FIG. 6 to describe the configuration of a magnetic head for perpendicular magnetic recording of a first embodiment of the invention. FIG. 5 is a front view of the medium facing surface of the magnetic head of the embodiment. FIG. 6 is a cross-sectional view for illustrating the configuration of the magnetic head of the embodiment. FIG. 6 illustrates a cross section orthogonal to the medium facing surface and a surface of a substrate. The arrow indicated with T in FIG. 6 shows the direction of travel of a recording medium.

As shown in FIG. 5 and FIG. 6, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a top shield layer 7 made of a magnetic material and disposed on the top shield gap film 6.

The MR element 5 has an end located in the medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element. The GMR element may be of a current-in-plane (CIP) type wherein a current used for detecting magnetic signals is fed in the direction nearly parallel to the plane of each layer making up the GMR element, or may be of a current-perpendicular-to-plane (CPP) type wherein a current used for detecting magnetic signals is fed in the direction nearly perpendicular to the plane of each layer making up the GMR element.

The magnetic head further comprises a nonmagnetic layer 81 and a middle magnetic layer 82 that are disposed on the top shield layer 7 one by one. The nonmagnetic layer 81 is made of a nonmagnetic material such as alumina. The middle magnetic layer 82 is made of a magnetic material. The portions from the bottom shield layer 3 to the middle magnetic layer 82 make up a read head. The middle magnetic layer 82 has a function of a shield layer of the read head and a function of an auxiliary pole of a write head that will be described later, that is, a function of returning a magnetic flux that has magnetized the recording medium.

The magnetic head further comprises: an insulating layer 83 made of an insulating material and disposed on the middle magnetic layer 82; a coil 9 disposed on the insulating layer 83; an insulating layer 10 made of an insulating material and disposed around the coil 9 and in the space between the respective adjacent turns of the coil 9; and an insulating layer 11 made of an insulating material and disposed around the insulating layer 10. The coil 9 is flat-whorl-shaped. The coil 9 and the insulating layers 10 and 11 have flattened top surfaces. The insulating layers 83 and 11 are made of alumina, for example. The insulating layer 10 is made of photoresist, for example. The coil 9 is made of a conductive material such as copper.

The magnetic head further comprises an encasing layer 12 made of a nonmagnetic material and disposed on the flattened top surfaces of the coil 9 and the insulating layers 10 and 11. The encasing layer 12 has a groove 12a that opens in the top surface thereof. The encasing layer 12 may be made of an insulating material such as alumina, silicon oxide ($SiO_x$), or silicon oxynitride (SiON), or a nonmagnetic metal material such as Ru, Ta, Mo, Ti, W, NiCu, NiB or NiP.

The magnetic head further comprises a nonmagnetic metal layer 13 and two side shield layers 14A and 14B. The nonmagnetic metal layer 13 is made of a nonmagnetic metal material and disposed on a region of the top surface of the encasing layer 12 that is away from the medium facing surface 30. The nonmagnetic metal layer 13 has a sidewall 13a located directly above the edge of the groove 12a of the encasing layer 12. The side shield layers 14A and 14B are made of a magnetic metal material and disposed adjacent to the nonmagnetic metal layer 13 on a region of the top surface of the encasing layer 12 that is closer to the medium facing surface 30 than the nonmagnetic metal layer 13. The side shield layers 14A and 14B respectively have sidewalls 14Aa and 14Ba located directly above the edge of the groove 12a of the encasing layer 12.

The nonmagnetic metal layer 13 may be made of any of Ru, Ta, Mo, W, Ti, Rh, Re, Pt, Pd, Ir, NiCr, NiP, NiB, NiCu, $WSi_2$, $TaSi_2$, $TiSi_2$, TiN, and TiW, for example. The side shield layers 14A and 14B may be made of any of NiFe, CoNiFe, and CoFe, for example.

The magnetic head further comprises an encasing section 40 that is formed of the groove 12a of the encasing layer 12, the sidewall 13a of the nonmagnetic metal layer 13, and the sidewalls 14Aa and 14Ba of the side shield layers 14A and 14B and that accommodates at least part of a pole layer that will be described later.

The magnetic head further comprises a nonmagnetic film 15, a polishing stopper layer 16 and the pole layer 17 that are disposed in the encasing section 40. The nonmagnetic film 15 is made of a nonmagnetic material disposed to touch the surface of the encasing section 40. The pole layer 17 is made of a magnetic material and disposed apart from the surface of the encasing section 40. The polishing stopper layer 16 is disposed between the nonmagnetic film 15 and the pole layer 17. The polishing stopper layer 16 also functions as a seed layer used for forming the pole layer 17 by plating. The pole layer 17 incorporates: a first layer 171 located closer to the surface of the encasing section 40; and a second layer 172 located farther from the surface of the encasing section 40. The first layer 171 may be omitted, however.

The nonmagnetic film 15 may be made of an insulating material or a semiconductor material, for example. The insulating material as the material of the nonmagnetic film 15 may be any of alumina, silicon oxide ($SiO_x$), and silicon oxynitride (SiON). The semiconductor material as the material of the nonmagnetic film 15 may be polycrystalline silicon or amorphous silicon.

The polishing stopper layer 16 is made of a nonmagnetic conductive material. The material of the polishing stopper layer 16 may be the same as that of the nonmagnetic metal layer 13.

Each of the first layer 171 and the second layer 172 is made of a magnetic metal material. The first layer 171 may be made of any of CoFeN, CoNiFe, NiFe, and CoFe, for example. The second layer 172 may be made of any of NiFe, CoNiFe and CoFe, for example.

The magnetic head further comprises a gap layer 18 made of a nonmagnetic material and disposed on the top surfaces of the nonmagnetic film 15, the polishing stopper layer 16, and the pole layer 17. The gap layer 18 is a flat layer. The gap layer 18 has an opening located at a distance from the medium facing surface 30. The gap layer 18 may be made of an insulating material such as alumina or a nonmagnetic metal material such as Ru, NiCu, Ta, W, NiB or NiP.

The side shield layers 14A and 14B have end faces located in the medium facing surface 30 on both sides of the end face of the pole layer 17, the sides being opposed to each other in the direction of track width. The nonmagnetic film 15 and the polishing stopper layer 16 are disposed between the pole layer 17 and the side shield layers 14A and 14B. In the medium facing surface 30 both ends 18a and 18b of the end face of the gap layer 18 opposed to each other in the direction of track width are located outside the sidewalls 14Aa and 14Ba of the side shield layers 14A and 14B along the direction of track width. In the medium facing surface 30 the end face of the gap layer 18 has a shape that linearly extends in the direction of track width.

The magnetic head further comprises a main shield layer 20. The main shield layer 20 has: a first layer 20A disposed on the side shield layers 14A and 14B and the gap layer 18; a yoke layer 20B disposed on a portion of the pole layer 17 where the opening of the gap layer 18 is formed; and a second layer 20C disposed to couple the first layer 20A to the yoke layer 20B. The second layer 20C has an end located in the medium facing surface 30. The first layer 20A, the yoke layer 20B and the second layer 20C are each made of a magnetic material. These layers 20A to 20C may be made of any of CoFeN, CoNiFe, NiFe and CoFe, for example.

The magnetic head further comprises a nonmagnetic layer 21 made of a nonmagnetic material and disposed around the yoke layer 20B. A portion of the nonmagnetic layer 21 is disposed on a side of the first layer 20A. The nonmagnetic layer 21 is made of an inorganic insulating material such as alumina or coating glass. Alternatively, the nonmagnetic layer 21 may be made up of a layer of a nonmagnetic metal material and a layer of an insulating material disposed thereon. In this case, the nonmagnetic metal material may be a refractory metal such as Ta, Mo, Nb, W, Cr, Ru, NiCu, Pd, or Hf.

The magnetic head further comprises: an insulating layer 22 disposed on regions of the top surfaces of the yoke layer 20B and the nonmagnetic layer 21 in which a coil 23 described later is disposed; the coil 23 disposed on the insulating layer 22; and an insulating layer 24 disposed around the coil 23 and in the space between the respective adjacent turns of the coil 23. The coil 23 is flat-whorl-shaped. A portion of the coil 23 passes between the second layer 20C and the yoke layer 20B. The coil 23 is made of a conductive material such as copper. The insulating layer 24 is made of photoresist, for example.

The portions from the middle magnetic layer 82 to the second layer 20C of the main shield layer 20 make up the write head. The magnetic head further comprises a protection layer 25 formed to cover the main shield layer 20. The protection layer 25 is made of alumina, for example.

As described so far, the magnetic head of the embodiment comprises the medium facing surface 30 that faces toward a recording medium, the read head, and the write head. The read head and the write head are stacked on the substrate 1. The read head is located backward along the direction T of travel of the recording medium (that is, located closer to the air inflow end of the slider). The write head is located forward along the direction T of travel of the recording medium (that is, located closer to the air outflow end of the slider).

The read head comprises the MR element 5 as the read element, and the bottom shield layer 3 and the top shield layer 7 for shielding the MR element 5. Portions of the bottom shield layer 3 and the top shield layer 7 that are located on a side of the medium facing surface 30 are opposed to each other, the MR element 5 being placed between these portions. The read head further comprises: the bottom shield gap film 4 disposed between the MR element 5 and the bottom shield layer 3; and the top shield gap film 6 disposed between the MR element 5 and the top shield layer 7.

The write head comprises the coil 9, the encasing layer 12, the nonmagnetic metal layer 13, the side shield layers 14A and 14B, the nonmagnetic film 15, the polishing stopper layer 16, the pole layer 17, the gap layer 18, the main shield layer 20, and the coil 23. The coils 9 and 23 generate a magnetic field corresponding to data to be written on the recording medium. The coil 9 is not a component requisite for the write head and may be omitted.

The pole layer 17 has an end face located in the medium facing surface 30. The pole layer 17 allows a magnetic flux corresponding to the field generated by the coil 23 to pass therethrough and generates a write magnetic field for writing the data on the medium by using the perpendicular magnetic recording system.

The main shield layer 20 has an end face located in the medium facing surface 30, and has a portion located away from the medium facing surface 30 and coupled to the pole layer 17. The gap layer 18 is made of a nonmagnetic material, has an end face located in the medium facing surface 30, and is provided between the pole layer 17 and the main shield layer 20.

In the medium facing surface 30, the end face of the main shield layer 20 is disposed forward of the end face of the pole layer 17 along the direction T of travel of the recording medium with a specific space created by the thickness of the gap layer 18. The thickness of the gap layer 18 falls within a range of 20 to 50 nm inclusive, for example. At least part of the coil 23 is disposed between the pole layer 17 and the main shield layer 20 and insulated from the pole layer 17 and the main shield layer 20. The thickness of the coil 23 falls within a range of 1.5 to 3 μm inclusive, for example.

The pole layer 17 is disposed in the encasing section 40 with the nonmagnetic film 15 and the polishing stopper layer 16 disposed between the pole layer 17 and the encasing section 40. The nonmagnetic film 15 has a thickness that falls within a range of 20 to 80 nm inclusive, for example. However, the thickness of the nonmagnetic film 15 is not limited to this range but may be of any other value, depending on the track width. The polishing stopper layer 16 has a thickness that falls within a range of 20 to 80 nm inclusive, for example.

The pole layer 17 incorporates: the first layer 171 located closer to the surface of the encasing section 40; and the second layer 172 located farther from the surface of the encasing section 40. The first layer 171 has a thickness that falls within a range of 0 to 100 nm inclusive, for example. The first layer 171 having a thickness of 0 nm means that the first layer 171 is not provided.

The main shield layer 20 has: the first layer 20A disposed adjacent to the gap layer 18; the yoke layer 20B disposed on the portion of the pole layer 17 where the opening of the gap layer 18 is formed; and the second layer 20C disposed to couple the first layer 20A to the yoke layer 20B. A portion of the second layer 20C is disposed between the medium facing surface 30 and the at least part of the coil 23.

The first layer 20A has a first end located in the medium facing surface 30 and a second end opposite to the first end. Throat height TH is the distance between the medium facing surface 30 and a point at which the space between the pole layer 17 and the main shield layer 20 starts to increase when seen from the medium facing surface 30. In the embodiment, the throat height TH is the distance between the medium facing surface 30 and an end of the first layer 20A farther from the medium facing surface 30. The throat height TH falls within a range of 0.05 to 0.3 μm inclusive, for example.

Figure 1:
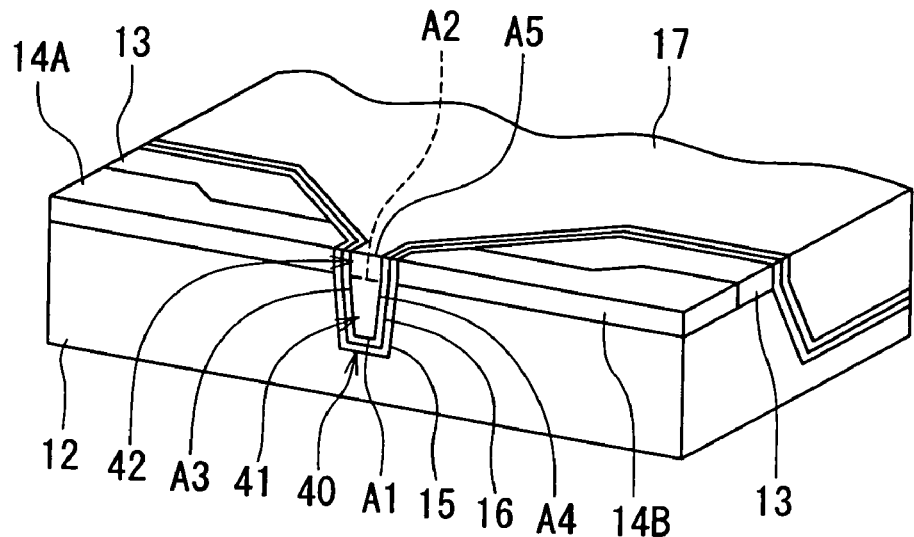
FIG. 1 is a perspective view illustrating portions of a pole layer and side shield layers of a magnetic head of a first embodiment of the invention in a neighborhood of the medium facing surface.
Figure 2:
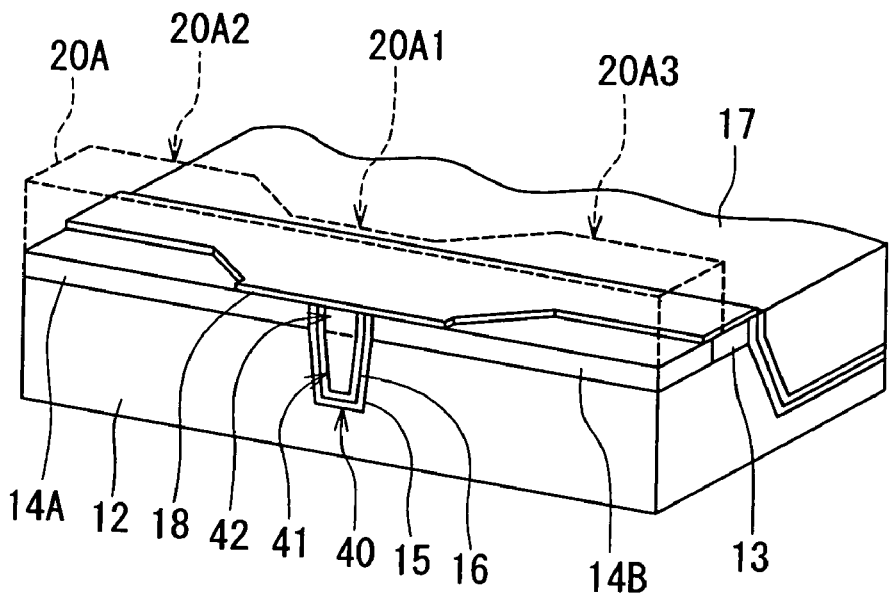
FIG. 2 is a perspective view illustrating portions of the pole layer, the side shield layers and a gap layer of the magnetic head of the first embodiment of the invention in a neighborhood of the medium facing surface.
Figure 3:
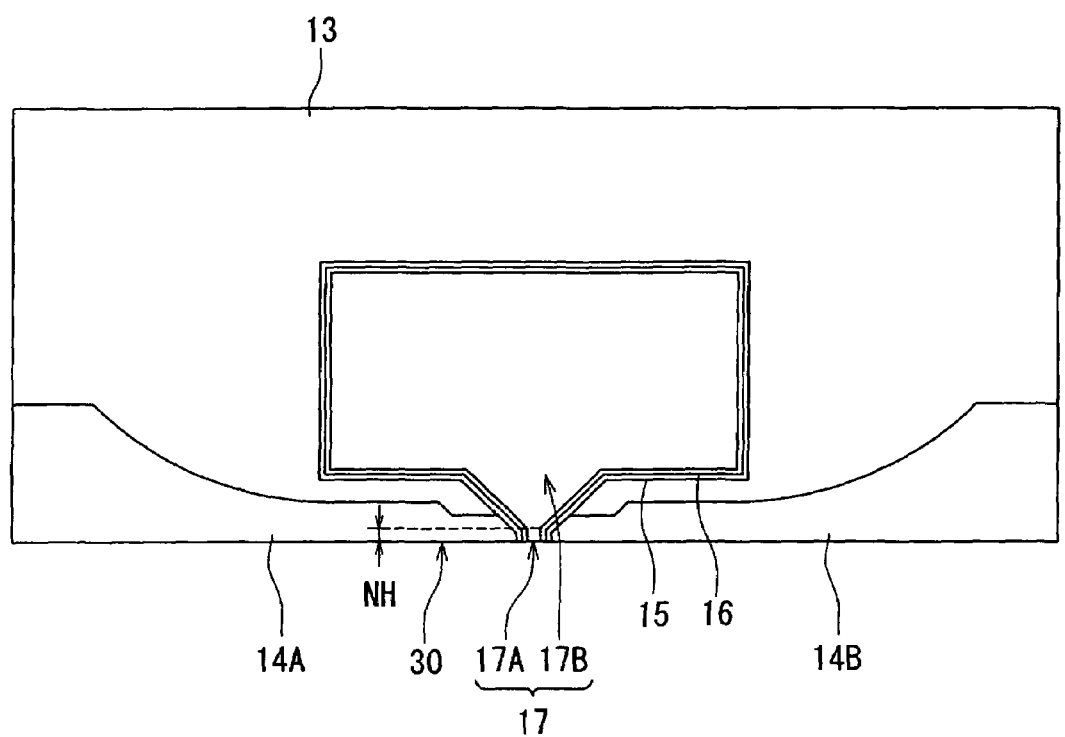
FIG. 3 is a top view illustrating the pole layer, a nonmagnetic metal layer and the side shield layers of the magnetic head of the first embodiment of the invention.
Figure 4:
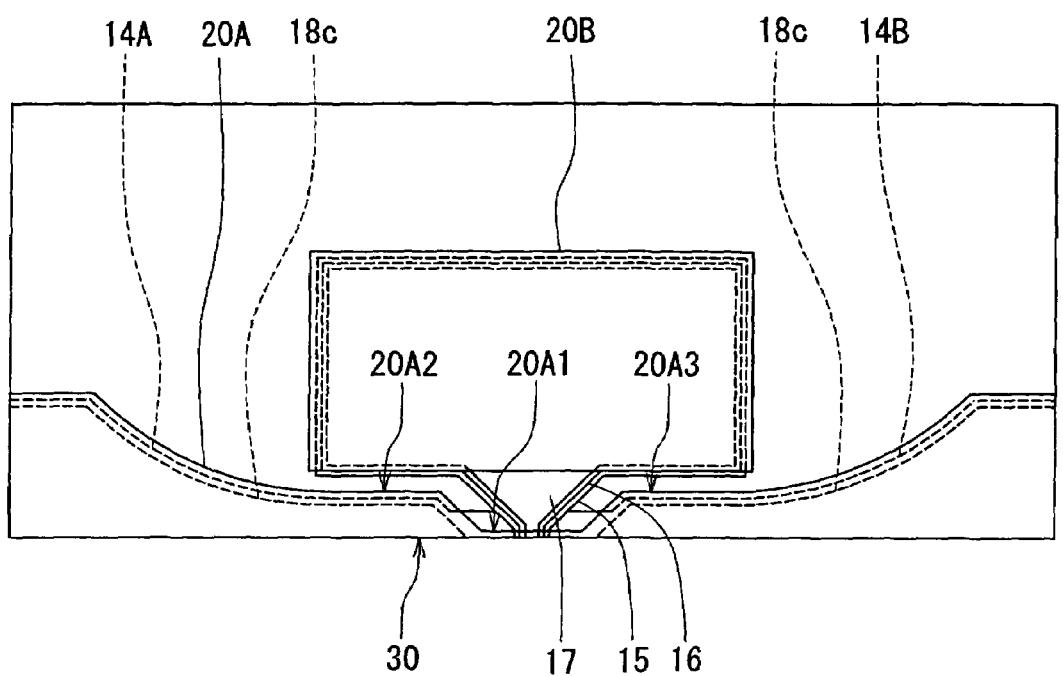
FIG. 4 is a top view illustrating the pole layer, the side shield layers, a first layer of a main shield layer, and a yoke layer of the main shield layer of the magnetic head of the first embodiment of the invention.

Reference is now made to FIG. 1 to FIG. 4 to describe the pole layer 17, the side shield layers 14A and 14B, and the gap layer 18 in detail. FIG. 1 is a perspective view illustrating portions of the pole layer 17 and the side shield layers 14A and 14B in a neighborhood of the medium facing surface 30. FIG. 2 is a perspective view illustrating portions of the pole layer 17, the side shield layers 14A and 14B and the gap layer 18 in a neighborhood of the medium facing surface 30. FIG. 3 is a top view illustrating the pole layer 17, the nonmagnetic metal layer 13, and the side shield layers 14A and 14B. FIG. 4 is a top view illustrating the pole layer 17, the side shield layers 14A and 14B, the first layer 20A, and the yoke layer 20B.

As shown in FIG. 1, at least part of the pole layer 17 is placed in the encasing section 40 formed of the groove 12a of the encasing layer 12, the sidewall 13a of the nonmagnetic metal layer 13, and the sidewalls 14Aa and 14Ba of the side shield layers 14A and 14B.

As shown in FIG. 3, the pole layer 17 incorporates a track width defining portion 17A and a wide portion 17B. The track width defining portion 17A has an end face located in the medium facing surface 30. The wide portion 17B is located farther from the medium facing surface 30 than the track width defining portion 17A and has a width greater than the width of the track width defining portion 17A. The width of the track width defining portion 17A does not change in accordance with the distance from the medium facing surface 30. For example, the wide portion 17B is equal in width to the track width defining portion 17A at the interface with the track width defining portion 17A, and gradually increases in width as the distance from the medium facing surface 30 increases and then maintains a specific width to the end of the wide portion 17B. In the embodiment the track width defining portion 17A is a portion of the pole layer 17 from the end face located in the medium facing surface 30 to the point at which the width of the pole layer 17 starts to increase. Here, the length of the track width defining portion 17A taken in the direction orthogonal to the medium facing surface 30 is called a neck height NH. The neck height NH falls within a range of 0.1 to 0.3 μm inclusive, for example.

As shown in FIG. 1 and FIG. 2, the end face of the pole layer 17 located in the medium facing surface 30 incorporates: a first region 41; and a second region 42 connected to the first region 41 and disposed between the first region 41 and the end face of the gap layer 18 located in the medium facing surface 30. The first region 41 has a width that decreases as the distance from the gap layer 18 increases. The second region 42 has a uniform width that defines the track width. At the boundary between the first region 41 and the second region 42, the first region 41 and the second region 42 are equal in width.

The first region 41 has: a first side A1 closest to the substrate 1; a second side A2 opposite to the first side A1; a third side A3 connecting an end of the first side A1 to an end of the second side A2; and a fourth side A4 connecting the other end of the first side A1 to the other end of the second side A2. Each of the third side A3 and the fourth side A4 forms an angle that falls within a range of 5 to 15 degrees inclusive, for example, with respect to the direction orthogonal to the top surface of the substrate 1.

The second region 42 has a uniform width that is equal to the length of the second side A2 and that defines the track width. The width of the second region 42, that is, the track width, falls within a range of 0.05 to 0.20 μm inclusive, for example. The two sides of the second region 42 opposed to each other in the direction of width are orthogonal to the top surface of the substrate 1. In the medium facing surface 30 the end faces of the side shield layers 14A and 14B are respectively located on both sides of the second region 42, the sides being opposed to each other in the direction of track width. The thickness of the pole layer 17 falls within a range of 0.15 to 0.35 μm inclusive, for example.

The nonmagnetic film 15 and the polishing stopper layer 16 are each made of a nonmagnetic material and are disposed between the pole layer 17 and the sidewalls 14Aa and 14Ba of the side shield layers 14A and 14B. Each of the nonmagnetic film 15 and the polishing stopper layer 16 corresponds to the nonmagnetic film of the invention.

As shown in FIG. 3, the nonmagnetic metal layer 13 is disposed on a region of the top surface of the encasing layer 12 away from the medium facing surface 30. The side shield layers 14A and 14B are disposed adjacent to the nonmagnetic metal layer 13 on regions of the top surface of the encasing layer 12 closer to the medium facing surface 30 than the nonmagnetic metal layer 13. The sidewalls 14Aa and 14Ba of the side shield layers 14A and 14B are disposed to be opposed to both sides of the track width defining portion 17A and both sides of a portion of the wide portion 17B. The length of each of the side shield layers 14A and 14B taken in the direction orthogonal to the medium facing surface 30 increases as the distance from the pole layer 17 increases.

As shown in FIG. 5, in the medium facing surface 30, both ends 18a and 18b of the end face of the gap layer 18 opposed to each other in the direction of track width are located outside the sidewalls 14Aa and 14Ba of the side shield layers 14A and 14B along the direction of track width.

The side shield layers 14A and 14B each have a thickness equal to or smaller than that of the pole layer 17. The thickness of each of the side shield layers 14A and 14B is preferably 15 to 70 percent of the thickness of the pole layer 17. The thickness of each of the side shield layers 14A and 14B falls within a range of 30 to 100 nm, for example. It is preferred that each of the side shield layers 14A and 14B have a saturation flux density lower than that of the pole layer 17. This is because, if the saturation flux density of each of the side shield layers 14A and 14B is great, there occurs flux leakage from the side shield layers 14A and 14B, and adjacent track erase is thereby likely to occur.

The side shield layers 14A and 14B are connected to the first layer 20A of the main shield layer 20. As shown in FIG. 4, the first layer 20A has: a middle portion 20A1 including a portion opposed to the pole layer 17 with the gap layer 18 disposed in between; and two side portions 20A2 and 20A3 disposed at locations outside the middle portion 20A1 in the direction of width. The length of the middle portion 20A1 taken in the direction orthogonal to the medium facing surface 30 is uniform. The maximum length of each of the side portions 20A2 and 20A3 taken in the direction orthogonal to the medium facing surface 30 is greater than the length of the middle portion 20A1 taken in the direction orthogonal to the medium facing surface 30. The thickness of the first layer 20A falls within a range of 0.25 to 0.45 µm inclusive, for example. The thickness of the second layer 20C falls within a range of 0.5 to 1.5 µm inclusive, for example.

Reference is now made to FIG. 7 to FIG. 20B to describe a method of manufacturing the magnetic head of the embodiment. FIG. 7, FIG. 10, FIG. 14, FIG. 16 and FIG. 18 are top views of layered structures obtained in manufacturing process of the magnetic head of the embodiment. In these drawings each broken line with numeral 30 indicates the location at which the medium facing surface 30 is to be formed. FIG. 8A, FIG. 9A, FIG. 11A, FIG. 12A, FIG. 13A, FIG. 15A, FIG. 17A, FIG. 19A and FIG. 20A are cross-sectional views of the layered structures orthogonal to the medium facing surface and the substrate. FIG. 8B, FIG. 9B, FIG. 11B, FIG. 12B, FIG. 13B, FIG. 15B, FIG. 17B, FIG. 19B and FIG. 20B are cross-sectional views illustrating cross sections of portions of the layered structures at the location where the medium facing surface is to be formed. The portions closer to the substrate 1 than the encasing layer 12 are omitted in FIG. 8A, FIG. 8B, FIG. 9A, FIG. 9B, FIG. 11A, FIG. 11B, FIG. 12A, FIG. 12B, FIG. 13A, FIG. 13B, FIG. 15A, FIG. 15B, FIG. 17A, FIG. 17B, FIG. 19A, FIG. 19B, FIG. 20A and FIG. 20B. The broken line with numeral 30 indicates the location at which the medium facing surface 30 is to be formed in each of 8A, FIG. 9A, FIG. 11A, FIG. 12A, FIG. 13A, FIG. 15A, FIG. 17A, FIG. 19A and FIG. 20A.

According to the method of manufacturing the magnetic head of the embodiment, as shown in FIG. 5 and FIG. 6, the insulating layer 2, the bottom shield layer 3 and the bottom shield gap film 4 are first formed one by one on the substrate 1. Next, the MR element 5 and leads (not shown) connected to the MR element 5 are formed on the bottom shield gap film 4. Next, the top shield gap film 6 is formed to cover the MR element 5 and the leads. Next, the top shield layer 7, the nonmagnetic layer 81, the middle magnetic layer 82, and the insulating layer 83 are formed one by one on the top shield gap film 6. Next, the coil 9 and the insulating layers 10 and 11 are formed on the insulating layer 83. Next, the top surfaces of the coil 9 and the insulating layers 10 and 11 are flattened by CMP, for example.

Figure 7:
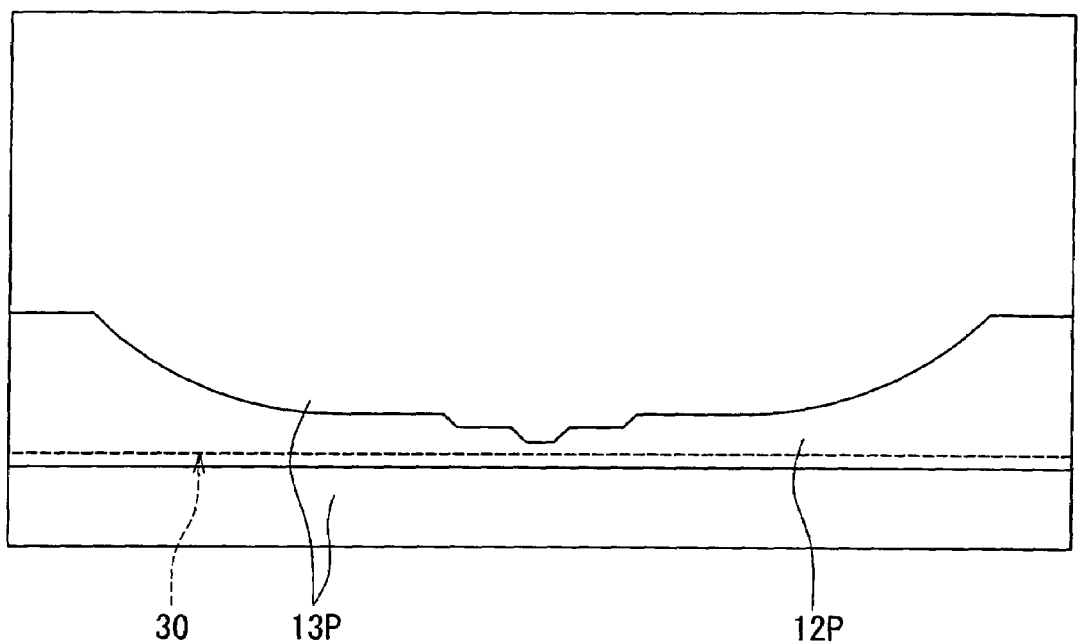
FIG. 7 is a top view of a layered structure obtained in a step of a method of manufacturing the magnetic head of the first embodiment of the invention.

FIG. 7, FIG. 8A and FIG. 8B illustrate the following step. In the step, first, a nonmagnetic layer 12P is formed on the flattened top surfaces of the coil 9 and the insulating layers 10 and 11. The groove 12a will be formed in the nonmagnetic layer 12P later and the nonmagnetic layer 12P will be thereby formed into the encasing layer 12. Next, a nonmagnetic metal film 13P that will be the nonmagnetic metal layer 13 later is formed by sputtering, for example, on the nonmagnetic layer 12P. The nonmagnetic metal film 13P has a thickness of 50 to 100 nm, for example. Next, a portion of the nonmagnetic metal film 13P is selectively etched so as to expose a portion of the top surface of the nonmagnetic layer 12P including portions on which the side shield layers 14A and 14B will be disposed later. This etching is performed by reactive ion etching or ion beam etching, for example. The nonmagnetic metal film 13P is thereby formed on part of the top surface of the nonmagnetic layer 12P.

FIG. 9A and FIG. 9B illustrate the following step. In the step, a magnetic film 14P that will be the side shield layers 14A and 14B later is formed on the top surface of the nonmagnetic metal film 13P and part of the top surface of the nonmagnetic layer 12P on which the nonmagnetic metal film 13P is not formed. The magnetic film 14P is formed by plating, for example. In this case, a seed layer is first formed by sputtering, for example, on the entire top surface of the layered structure. Next, the magnetic film 14P is formed by plating on the seed layer. The magnetic film 14P has a thickness of 70 to 150 nm, for example, at this point.

Figure 10:
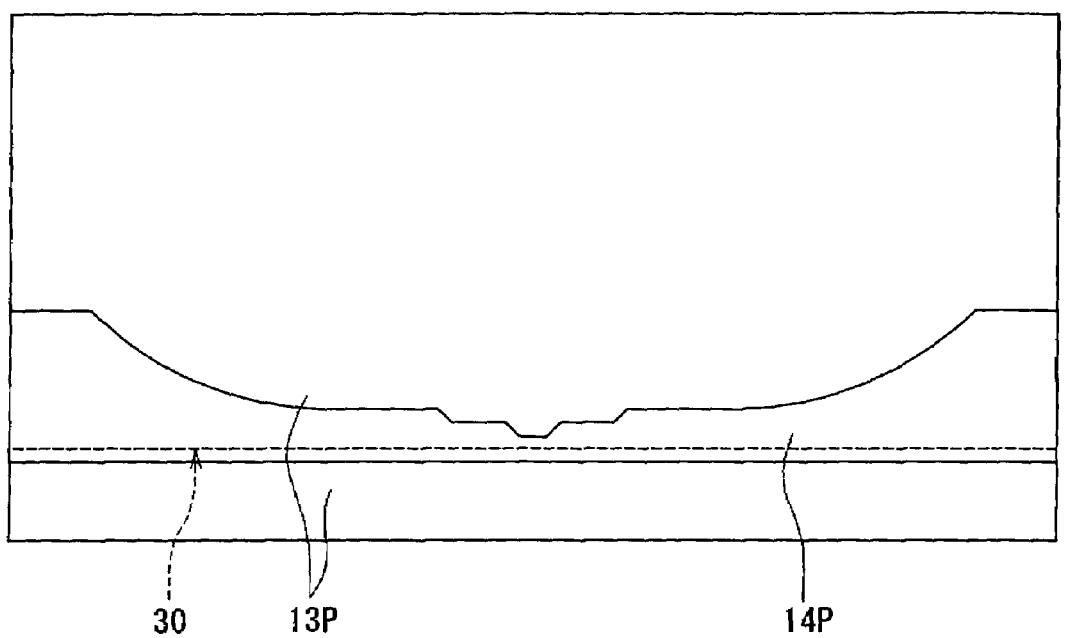
FIG. 10 is a top view of the layered structure obtained in a step that follows the step shown in FIG. 9A and FIG. 9B.

FIG. 10, FIG. 11A and FIG. 11B illustrate the following step. In the step, the top surface of the magnetic film 14P is polished by CMP, for example, such that the top surface of the nonmagnetic metal film 13P is the level at which the polishing is stopped. The top surfaces of the nonmagnetic metal film 13P and the magnetic film 14P are thereby flattened.

FIG. 12A and FIG. 12B illustrate the following step. In the step, first, a photoresist layer having a thickness of 1.0 µm, for example, is formed on the nonmagnetic metal film 13P and the magnetic film 14P. The photoresist layer is then patterned to form a mask 31 for making the encasing section 40. The mask 31 has an opening having a shape corresponding to the encasing section 40. Next, the nonmagnetic metal film 13P and the magnetic film 14P are selectively etched using the mask 31. Openings each having a shape corresponding to the opening of the mask 31 are thereby formed in the nonmagnetic metal film 13P and the magnetic film 14P. As a result, the nonmagnetic metal film 13P is formed into the nonmagnetic metal layer 13 having the sidewall 13a, and the magnetic film 14P is formed into the side shield layers 14A and 14B having the sidewalls 14Aa and 14Ba, respectively. The etching of the nonmagnetic metal film 13P and the magnetic film 14P is performed by ion beam etching or reactive ion etching, for example. The etching of the nonmagnetic metal film 13P and the magnetic film 14P is performed so that the sidewalls 13a, 14Aa and 14Ba formed by the etching are orthogonal to the top surface of the substrate 1.

Figures 13A, 13B:
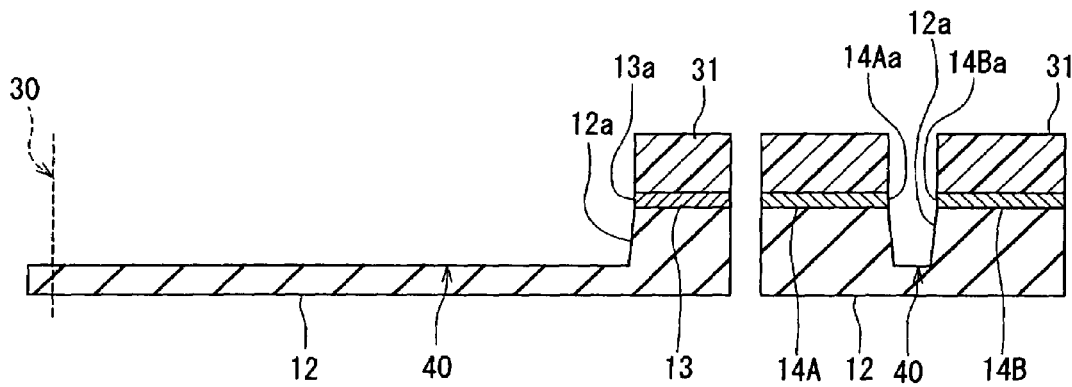
FIG. 13A and FIG. 13B are cross-sectional views of the layered structure obtained in a step that follows the step shown in FIG. 12A and FIG. 12B.
Figure 14:
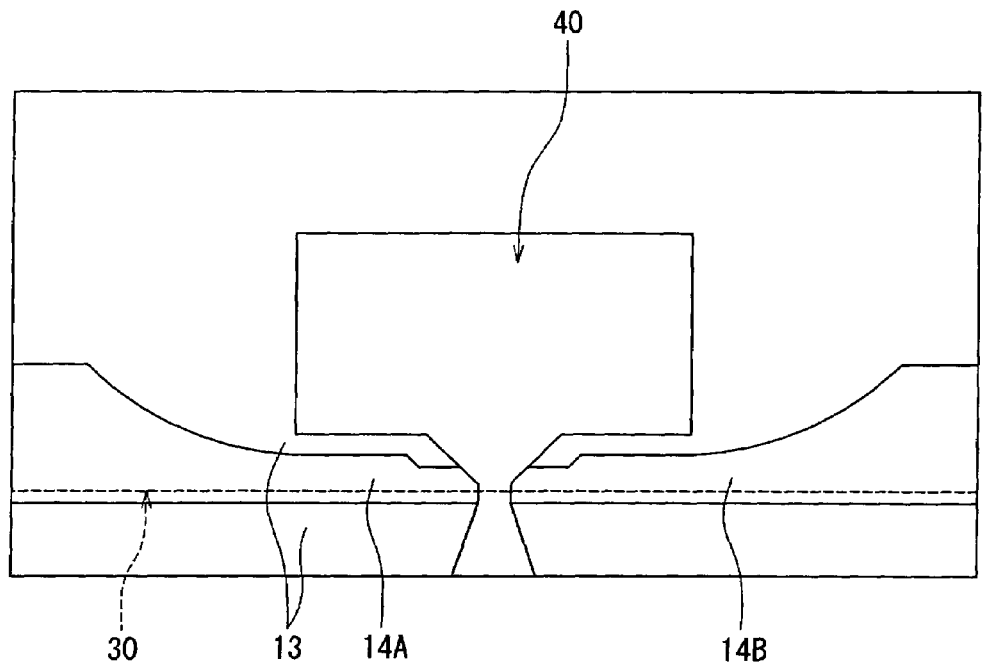
FIG. 14 is a top view of the layered structure obtained in a step that follows the step shown in FIG. 13A and FIG. 13B.

FIG. 13A and FIG. 13B illustrate the following step. In the step, the nonmagnetic layer 12P is selectively etched using the nonmagnetic metal layer 13 and the side shield layers 14A and 14B as masks. As a result, the groove 12a is formed in the nonmagnetic layer 12P, and the nonmagnetic layer 12P is thereby formed into the encasing layer 12. In addition, the encasing section 40 is formed of the groove 12a of the encasing layer 12, the sidewall 13a of the nonmagnetic metal layer 13, and the sidewalls 14Aa ad 14Ba of the side shield layers 14A and 14B. The etching of the nonmagnetic layer 12P may be performed by reactive ion etching using an etching gas containing $Cl_2$ and $BCl_3$. The etching of the nonmagnetic layer 12P is performed such that the walls of the groove 12a corresponding to both sides of the track width defining portion 17A of the pole layer 17 each form an angle that falls within a range of 5 to 15 degrees inclusive, for example, with respect to the direction orthogonal to the top surface of the substrate 1. Next, the mask 31 is removed as shown in FIG. 14.

Figures 15A, 15B:
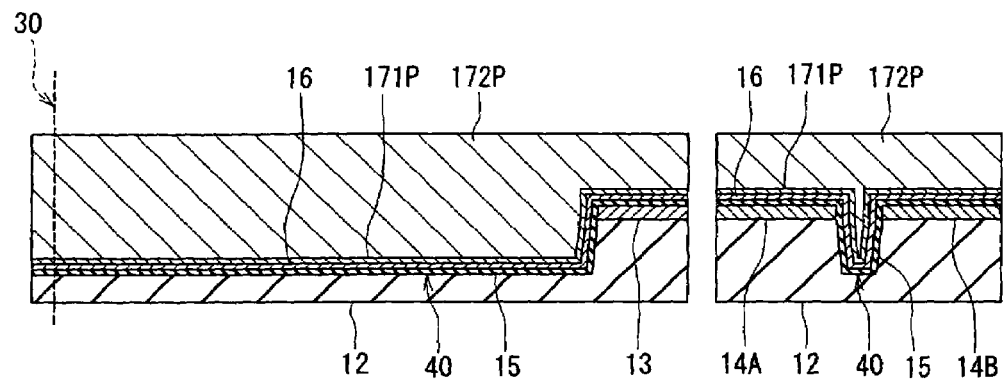
FIG. 15A and FIG. 15B are cross-sectional views of the layered structure obtained in a step that follows the step shown in FIG. 14.

FIG. 15A and FIG. 15B illustrate the following step. In the step, first, the nonmagnetic film 15 is formed on the entire top surface of the layered structure. The nonmagnetic film 15 is formed in the encasing section 40, too. The nonmagnetic film 15 is formed by sputtering or CVD, for example. It is possible to control the thickness of the nonmagnetic film 15 with precision. In the case of forming the nonmagnetic film 15 by CVD, it is preferred to employ a method called 'atomic layer CVD' (ALCVD) in which formation of a single atomic layer is repeated. In this case, it is possible to control the thickness of the nonmagnetic film 15 with higher precision. In the case of forming nonmagnetic film 15 by ALCVD, it is preferred to use alumina, in particular, as the material of the nonmagnetic film 15. In the case of using a semiconductor material to form the nonmagnetic film 15, it is preferred to form the nonmagnetic film 15 by ALCVD at a low temperature (around 200° C.) or by low-pressure CVD at a low temperature. The semiconductor material as the material of the nonmagnetic film 15 is preferably undoped polycrystalline silicon or amorphous silicon.

Next, the polishing stopper layer 16 is formed on the entire top surface of the layered structure by sputtering or ALCVD, for example. The polishing stopper layer 16 is formed in the encasing section 40, too. The polishing stopper layer 16 indicates the level at which polishing of the polishing step to be performed later is stopped.

Next, a first magnetic layer 171P to be the first layer 171 of the pole layer 17 is formed on the entire top surface of the layered structure. The first magnetic layer 171P is formed by sputtering or ion beam deposition, for example. In the case of forming the first magnetic layer 171P by sputtering, it is preferred to employ collimation sputtering or long throw sputtering. Since the first layer 171 may be omitted as previously described, it is not absolutely necessary to form the first magnetic layer 171P. Next, a second magnetic layer 172P to be the second layer 172 of the pole layer 17 is formed on the first magnetic layer 171P. The second magnetic layer 172P is formed such that the top surface thereof is located higher than the top surfaces of the nonmagnetic metal layer 13, the side shield layers 14A and 14B, the nonmagnetic film 15, and the polishing stopper layer 16. The second magnetic layer 172P is formed by frame plating, for example. In this case, the first magnetic layer 171P is used as an electrode for plating. If the polishing stopper layer 16 is made of a conductive material, the layer 16 is used as an electrode for plating, too. The second magnetic layer 172P may be formed by making an unpatterned plating layer and then patterning the plating layer through etching.

Figure 16:
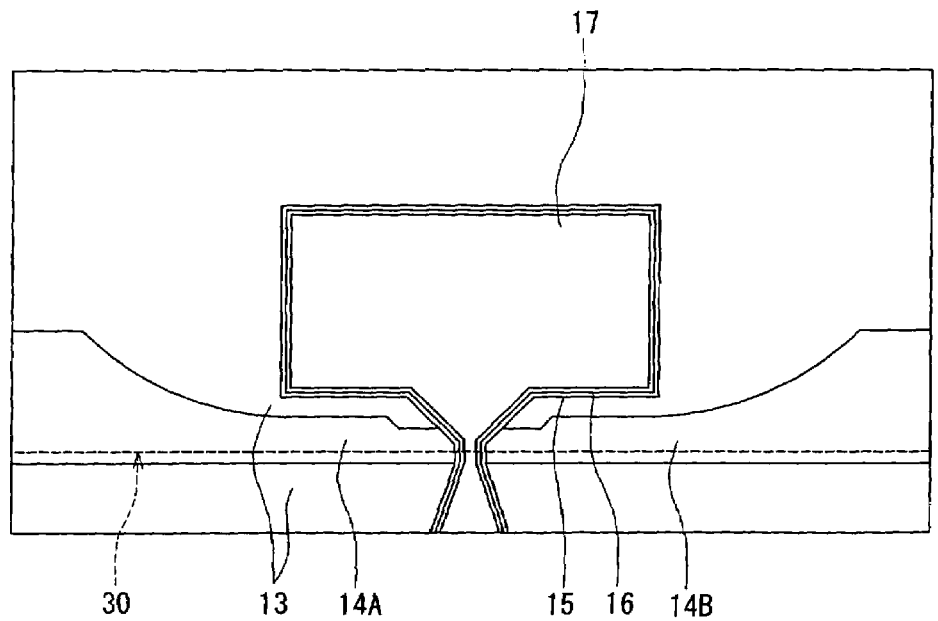
FIG. 16 is a top view of the layered structure obtained in a step that follows the step shown in FIG. 15A and FIG. 15B.
Figures 17A, 17B:
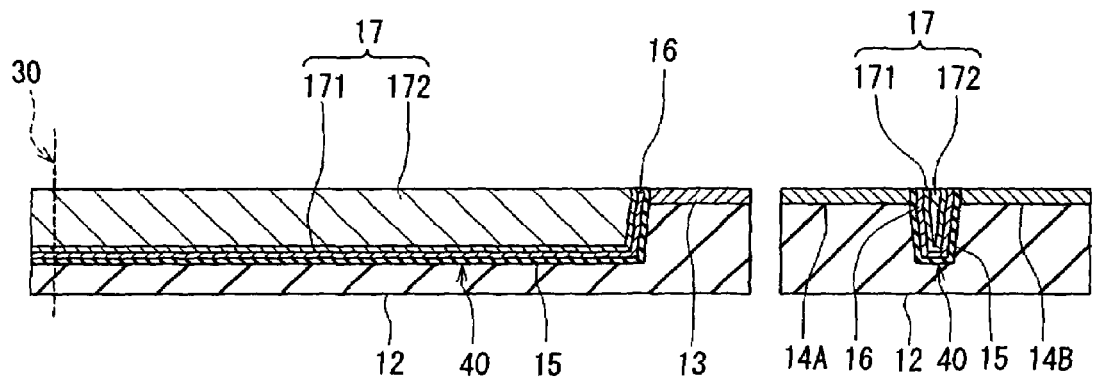
FIG. 17A and FIG. 17B are cross-sectional views of the layered structure shown in FIG. 16.

FIG. 16, FIG. 17A and FIG. 17B illustrate the following step. In the step, first, a coating layer not shown made of alumina, for example, and having a thickness of 0.5 to 1.2 μm, for example, is formed on the entire top surface of the layered structure. Next, the coating layer, the second magnetic layer 172P and the first magnetic layer 171P are polished by CMP, for example, so that the polishing stopper layer 16 is exposed, and the top surfaces of the polishing stopper layer 16, the first magnetic layer 171P and the second magnetic layer 172P are thereby flattened. In the case of polishing the coating layer, the second magnetic layer 172P and the first magnetic layer 171P by CMP, such a slurry is used that polishing is stopped when the polishing stopper layer 16 is exposed, such as an alumina-base slurry.

Next, the top surfaces of the first magnetic layer 171P and the second magnetic layer 172P are etched by ion beam etching, sputter etching, or reactive ion etching, for example. In this step, the polishing stopper layer 16 and the nonmagnetic film 15 are etched together with the top surfaces of the first magnetic layer 171P and the second magnetic layer 172P, so that at least portions of the polishing stopper layer 16 and the nonmagnetic film 15 located on the nonmagnetic metal layer 13 and the side shield layers 14A and 14B are removed. Through this step, the first magnetic layer 171P and the second magnetic layer 172P are formed into the first layer 171 and the second layer 172, respectively, and the pole layer 17 is thereby formed.

In this step, the etching may be further continued from the state in which the top surfaces of the nonmagnetic metal layer 13 and the side shield layers 14A and 14B are exposed so as to etch portions of the nonmagnetic metal layer 13, the side shield layers 14A and 14B, the polishing stopper layer 16, and the nonmagnetic film 15 together with the top surfaces of the first magnetic layer 171P and the second magnetic layer 172P. Through this step, the top surfaces of the nonmagnetic metal layer 13, the side shield layers 14A and 14B, the first layer 171, and the second layer 172 are flattened, and the thickness of the pole layer 17 taken in the medium facing surface is adjusted. In this step, if etching is performed by ion beam etching, in particular, it is possible to control the thickness of the pole layer 17 with precision.

Figure 18:
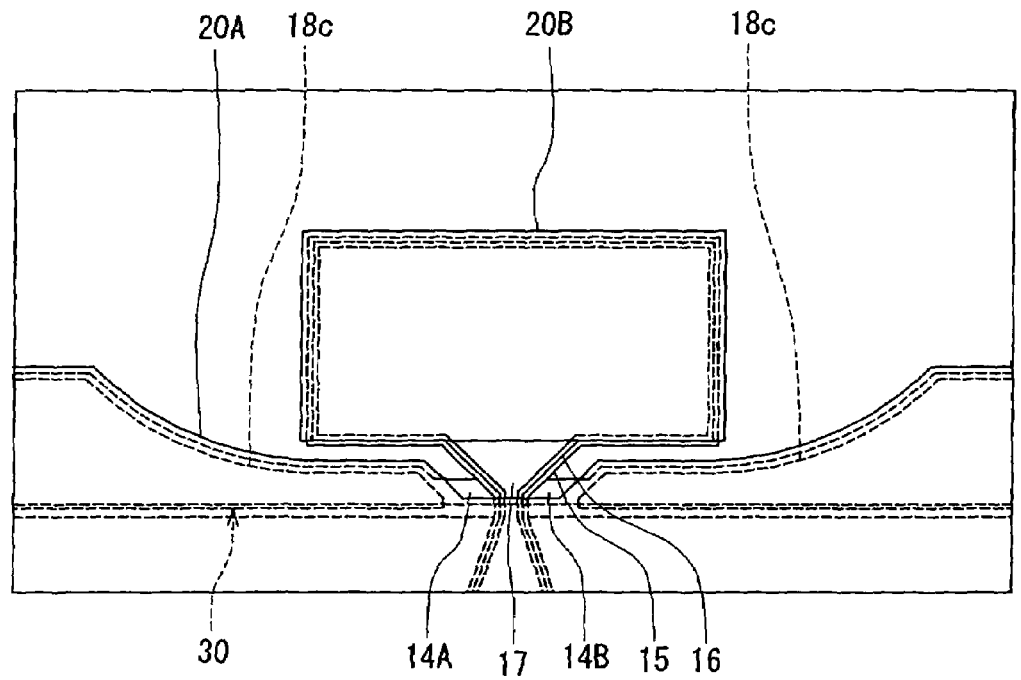
FIG. 18 is a top view of the layered structure obtained in a step that follows the step shown in FIG. 16.

FIG. 18, FIG. 19A and FIG. 19B illustrate the following step. In the step, first, the gap layer 18 is formed on the entire top surface of the layered structure. The gap layer 18 is formed by sputtering or CVD, for example. In the case of forming the gap layer 18 by CVD, it is preferred to employ ALCVD. In the case of forming the gap layer 18 by ALCVD, it is preferred to use alumina, in particular, as the material of the gap layer 18.

Next, the gap layer 18 is selectively etched to pattern the gap layer 18. As a result, an opening is formed in a region of the gap layer 18 where the yoke layer 20B will be disposed later, and two contact holes 18c for exposing the top surfaces of the two side shield layers 14A and 14B are formed.

Next, the first layer 20A is formed on the gap layer 18, and the yoke layer 20B is formed on the pole layer 17. The first layer 20A and the yoke layer 20B may be formed by frame plating or by making a magnetic layer through sputtering and then selectively etching the magnetic layer. The first layer 20A is connected to the side shield layers 14A and 14B through the contact holes 18c.

FIG. 20A and FIG. 20B illustrate the following step. In the step, first, the nonmagnetic layer 21 having a thickness of 1.0 to 1.5 µm, for example, is formed on the entire top surface of the layered structure. Next, the nonmagnetic layer 21 is polished by CMP, for example, so that the first layer 20A and the yoke layer 20B are exposed, and the top surfaces of the first layer 20A, the yoke layer 20B and the nonmagnetic layer 21 are flattened.

Next, as shown in FIG. 5 and FIG. 6, the insulating layer 22 having a thickness of 0.2 to 0.3 µm, for example, is formed on regions of the top surfaces of the yoke layer 20B and the nonmagnetic layer 21 in which the coil 23 will be disposed. Next, the coil 23 is formed by frame plating, for example, such that at least part of the coil 23 is disposed on the insulating layer 22. The insulating layer 24 is formed to cover the coil 23. Next, the second layer 20C is formed by frame plating, for example. Next, the protection layer 25 is formed to cover the entire top surface of the layered structure. Wiring and terminals are then formed on the protection layer 25, the substrate is cut into sliders, and the steps including polishing of the medium facing surface 30 and fabrication of flying rails are performed. The magnetic head is thus completed.

The operation and effects of the magnetic head of the embodiment will now be described. The magnetic head writes data on a recording medium by using the write head and reads data written on the recording medium by using the read head. In the write head the coil 23 generates a magnetic field that corresponds to the data to be written on the medium. The pole layer 17 and the main shield layer 20 form a magnetic path through which a magnetic flux corresponding to the magnetic field generated by the coil 23 passes. The pole layer 17 allows the flux corresponding to the field generated by the coil 23 to pass and generates a write magnetic field used for writing the data on the medium through the use of the perpendicular magnetic recording system. The main shield layer 20 takes in a disturbance magnetic field applied from outside the magnetic head to the magnetic head. It is thereby possible to prevent erroneous writing on the recording medium caused by the disturbance magnetic field intensively taken in into the pole layer 17.

According to the embodiment, in the medium facing surface 30, the end face of the main shield layer 20 is located forward of the end face of the pole layer 17 along the direction T of travel of the recording medium (that is, located closer to the air outflow end of the slider) with a specific small space created by the gap layer 18. The location of an end of the bit pattern written on the recording medium is determined by the location of the end of the pole layer 17 that is closer to the gap layer 18 and located in the medium facing surface 30. The main shield layer 20 takes in a magnetic flux generated from the end face of the pole layer 17 located in the medium facing surface 30 and extending in directions except the direction orthogonal to the surface of the recording medium so as to prevent the flux from reaching the recording medium. It is thereby possible to prevent a direction of magnetization of the bit pattern already written on the medium from being changed due to the effect of the above-mentioned flux. According to the embodiment, an improvement in linear recording density is thus achieved.

The magnetic head of the embodiment comprises the side shield layers 14A and 14B. The side shield layers 14A and 14B have end faces located on both sides of the end face of the pole layer 17 in the medium facing surface 30, the sides being opposed to each other in the direction of track width. The side shield layers 14A and 15B take in a magnetic flux generated from the end face of the pole layer 17 and extending in the direction of track width. As a result, according to the embodiment, it is possible to more greatly prevent the magnetic flux from extending in the direction of track width, the flux starting from the pole layer 17 across the gap layer 18 and reaching the main shield layer 20, compared with a case in which the side shield layers 14A and 14B are not provided. It is thereby possible to reduce the difference between the physical track width and the effective track width.

In the embodiment the nonmagnetic metal layer 13 and the two side shield layers 14A and 14B are disposed on the top surface of the encasing layer 12. The side shield layers 14A and 14B are disposed adjacent to the nonmagnetic metal layer 13 in regions closer to the medium facing surface 30 than the nonmagnetic metal layer 13. In the method of manufacturing the magnetic head of the embodiment, the encasing layer 12, the nonmagnetic metal layer 13, and the side shield layers 14A and 14B are formed in the following manner. First, the nonmagnetic layer 12P is formed, which will be formed into the encasing layer 12 later by forming the groove 12a therein. Next, the nonmagnetic metal film 13P that will be the nonmagnetic metal layer 13 later is formed on a portion of the top surface of the nonmagnetic layer 12P. Next, the magnetic film 14P that will be the side shield layers 14A and 14B later is formed on a portion of the top surface of the nonmagnetic layer 12P where the nonmagnetic metal film 13P is not formed. Next, the top surfaces of the nonmagnetic metal film 13P and the magnetic film 14P are flattened. Next, the nonmagnetic metal film 13P and the magnetic film 14P are selectively etched so that the nonmagnetic metal film 13P is formed into the nonmagnetic metal layer 13 and that the magnetic film 14P is formed into the side shield layers 14A and 14B. Next, the nonmagnetic layer 12P is selectively etched using the nonmagnetic metal layer 13 and the side shield layers 14A and 14B as masks, so that the groove 12a is formed and the nonmagnetic layer 12P is thereby formed into the encasing layer 12, and so that the encasing section 40 is formed of the groove 12a, the sidewall 13a of the nonmagnetic metal layer 13, and the sidewalls 14Aa and 14Ba of the side shield layers 14A and 14B.

According to the embodiment, it is possible to form the side shield layers 14A and 14B so that the thickness of the nonmagnetic metal layer 13 and that of each of the side shield layers 14A and 14B coincide with each other. It is therefore possible to control the thickness of each of the side shield layers 14A and 14B with precision.

Figure 21:
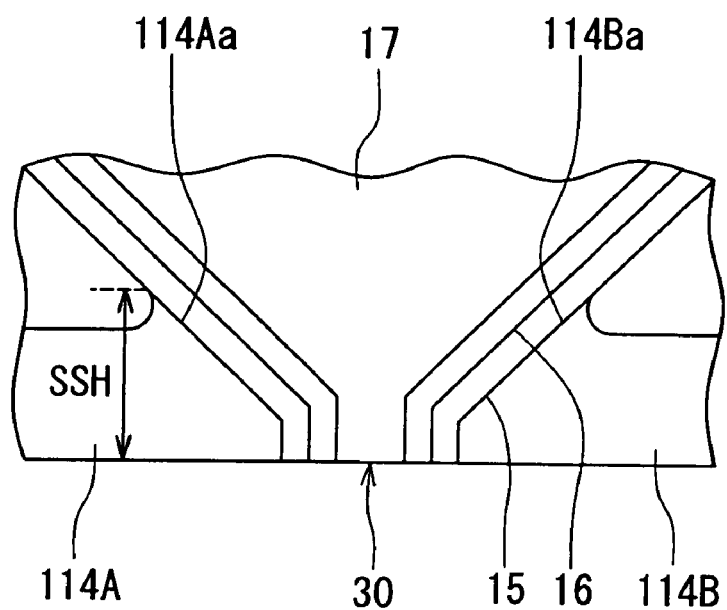
FIG. 21 is a top view illustrating portions of side shield layers and a pole layer of a magnetic head of a reference example.

Reference is now made to FIG. 21 to describe a problem that occurs if the nonmagnetic metal layer 13 is not provided. FIG. 21 is a top view illustrating portions of side shield layers and a pole layer of a magnetic head of a reference example without the nonmagnetic metal layer 13. The magnetic head of the reference example does not comprise the nonmagnetic metal layer 13 of the embodiment. Furthermore, the magnetic head of the reference example comprises side shield layers 114A and 114B in place of the side shield layers 14A and 14B of the embodiment. The side shield layers 114A and 114B have sidewalls 114Aa and 114Ba located directly above the edge of the groove 12a of the encasing layer 12. The sidewalls 114Aa and 114Ba are located opposite to both sides of the pole layer 17. Here, the distance between the medium facing surface 30 and an end of each of the sidewalls 114Aa and 114Ba farther from the medium facing surface 30 is called a side shield height and indicated with SSH. The magnitude of the side shield height SSH has an influence on characteristics of the write head.

In the reference example, the side shield layers 114A and 114B are formed through a method that will now be described. First, the nonmagnetic layer 12P is formed, which will be formed into the encasing layer 12 later by forming the groove 12a therein. Next, a magnetic film that will be the side shield layers 114A and 114B later is formed on the top surface of the nonmagnetic layer 12P. Next, the magnetic film is selectively etched to form an opening in the magnetic film. Next, the nonmagnetic layer 12P is selectively etched using the magnetic film as a mask, so that the groove 12a is formed and the nonmagnetic layer 12P is thereby formed into the encasing layer 12. Next, the nonmagnetic film 15, the polishing stopper layer 16 and the pole layer 17 are formed in the groove 12a of the encasing layer 12 and in the opening of the magnetic film. Next, the magnetic film is selectively etched by ion beam etching, for example, to form the side shield layers 114A and 114B.

In the reference example, as described above, the side shield layers 114A and 114B are patterned by selectively etching the magnetic film after the pole layer 17 is formed. In this case, as shown in FIG. 21, it is difficult to precisely form portions of the side shield layers 114A and 114B near ends of the sidewalls 114a and 114Ba farther from the medium facing surface 30. Therefore, the reference example has a problem that it is difficult to control the side shield height SSH with precision.

Figure 22:
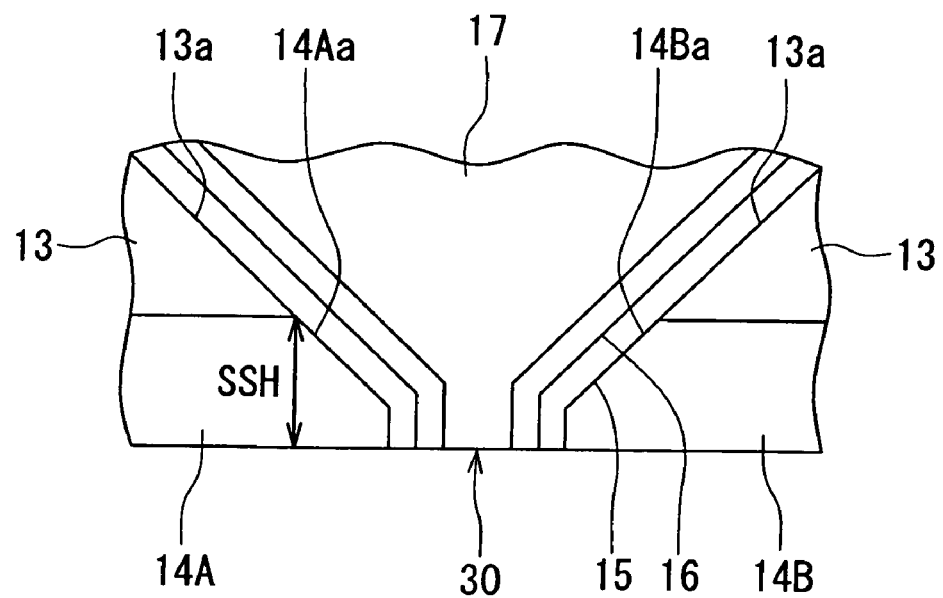
FIG. 22 is a top view illustrating portions of the side shield layers and the pole layer of the magnetic head of the first embodiment of the invention.

FIG. 22 is a top view illustrating portions of the side shield layers and the pole layer of the magnetic head of the embodiment. In the embodiment, too, the distance between the medium facing surface 30 and an end of each of the sidewalls 14Aa and 14Ba of the side shield layers 14A and 14B farther from the medium facing surface 30 is called a side shield height and indicated with SSH. In the embodiment, the side shield layers 14A and 14B are not patterned by etching after the pole layer 17 is formed. In the embodiment, the nonmagnetic metal layer 13 and the side shield layers 14A and 14B are formed by selectively etching the nonmagnetic metal film 13P and the magnetic film 14P before the encasing layer 12 is formed by selectively etching the nonmagnetic layer 12P. When the nonmagnetic metal layer 13 and the side shield layers 14A and 14B are thus formed, the location of the end of each of the sidewalls 14Aa and 14Ba of the side shield layers 14A and 14B farther from the medium facing surface 30 is clearly defined by the location of the boundary between the nonmagnetic metal layer 13 and each of the side shield layers 14A and 14B. According to the embodiment, it is thereby possible to control the side shield height SSH with precision.

According to the embodiment, as shown in FIG. 1, the end face of the pole layer 17 located in the medium facing surface 30 includes a portion having a width that decreases as the distance from the gap layer 18 increases. It is thereby possible to prevent the problems resulting from the skew.

According to the embodiment, the nonmagnetic metal layer 13 and the side shield layers 14A and 14B are disposed on the top surface of the encasing layer 12 having the groove 12a. In addition, the encasing section 40 is formed of the groove 12a of the encasing layer 12, the sidewall 13a of the nonmagnetic metal layer 13, and the sidewalls 14Aa and 14Ba of the side shield layers 14A and 14B. At least part of the pole layer 17 is placed in the encasing section 40. It is easier to form the sidewalls 13a, 14Aa and 14Ba in the nonmagnetic metal layer 13 and the side shield layers 14A and 14B by etching, compared with a case in which sidewalls having similar shapes are formed in a layer made of an inorganic insulating material. Furthermore, according to the embodiment, the nonmagnetic layer 12P is selectively etched using the nonmagnetic metal layer 13 and the side shield layers 14A and 14B as masks so as to form the tapered groove 12a. It is easy, too, to form the groove 12a in such a manner. According to the embodiment, it is therefore easy to form the encasing section 40.

The etching rate of the pole layer 17 and the side shield layers 14A and 14B each made of a magnetic metal material and that of the nonmagnetic metal layer 13 made of a nonmagnetic metal material are nearly equal. Therefore, according to the embodiment, it is possible to etch the top surfaces of the pole layer 17, the nonmagnetic metal layer 13, and the side shield layers 14A and 14B with precision. It is thereby possible to control the thickness of the pole layer 17 with precision.

According to the embodiment, the end face of the pole layer 17 located in the medium facing surface 30 incorporates the first region 41 and the second region 42 that is connected to the first region 41 and that is disposed between the first region 41 and the end face of the gap layer 18 located in the medium facing surface 30. The second region 42 has a uniform width that defines the track width. Therefore, according to the embodiment, it is possible to precisely control the track width. Because of these features of the embodiment, it is possible to precisely form the pole layer 17 at least part of which is placed in the encasing section 40. As a result, according to the embodiment, it is possible to form the pole layer 17 having a desired shape with accuracy.

According to the embodiment, the pole layer 17 is disposed in the encasing section 40 with the nonmagnetic film 15 and the polishing stopper layer 16 disposed between the pole layer 17 and the encasing section 40. Consequently, the pole layer 17 is smaller than the encasing section 40 in width. It is thereby possible to easily form the encasing section 40 and to easily reduce the width of the pole layer 17 and the width of the top surface of the track width defining portion 17A that defines the track width, in particular. As a result, according to the embodiment, it is possible to easily implement the track width that is smaller than the minimum track width that can be formed by photolithography and to control the track width with accuracy.

MODIFICATION EXAMPLE

Figure 23:
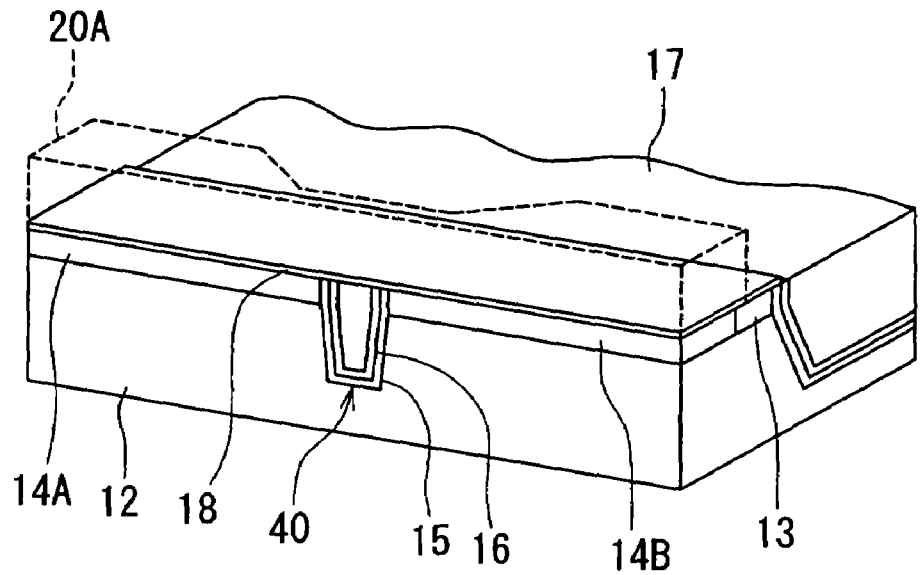
FIG. 23 is a perspective view illustrating portions of a pole layer, side shield layers and a gap layer of a magnetic head of a modification example of the first embodiment of the invention in a neighborhood of the medium facing surface.

Reference is now made to FIG. 23 to describe a modification example of the embodiment. FIG. 23 is a perspective view illustrating portions of the pole layer, the side shield layers and the gap layer of a magnetic head of the modification example. In the modification example, no contact hole is formed in the gap layer 18 for connecting the side shield layers 14A and 14B to the first layer 20A of the main shield layer 20. Therefore, the side shield layers 14A and 14B are not connected to the first layer 20A in the modification example. In this case, too, the side shield layers 14A and 14B exhibit the functions previously described. The remainder of configuration, function and effects of the modification example are similar to those of the magnetic head shown in FIG. 1 to FIG. 6.

Second Embodiment

Figure 24:
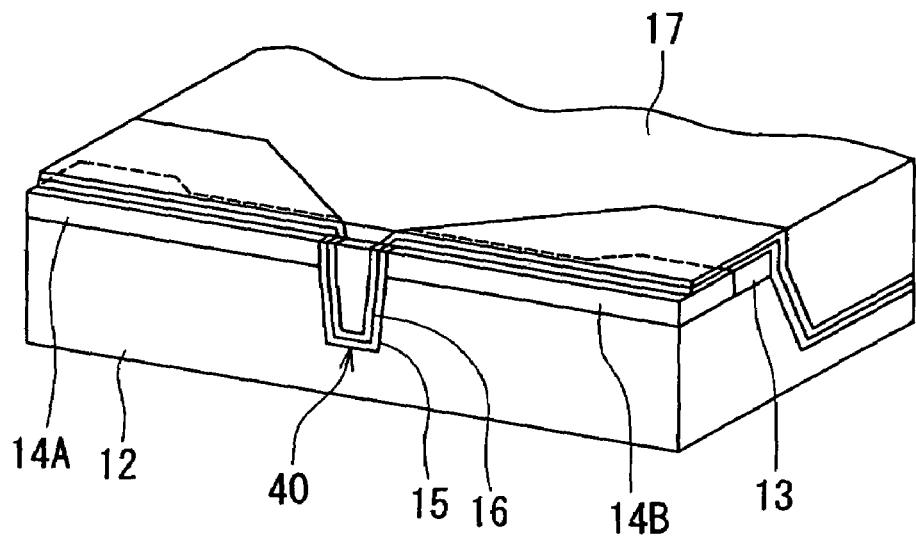
FIG. 24 is a perspective view illustrating portions of a pole layer and side shield layers of a magnetic head of a second embodiment of the invention in a neighborhood of the medium facing surface.
Figure 25:
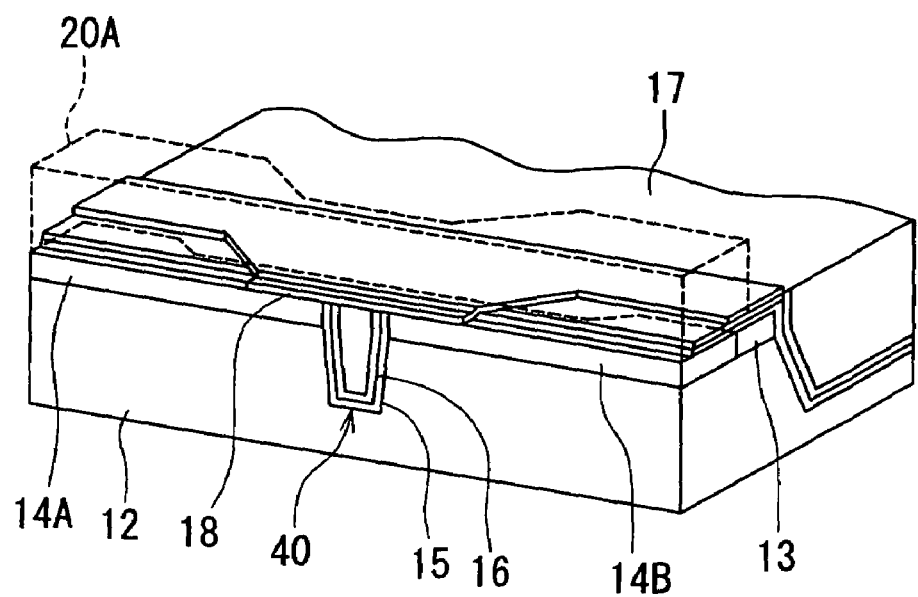
FIG. 25 is a perspective view illustrating portions of the pole layer, the side shield layers and a gap layer of the magnetic head of the second embodiment of the invention in a neighborhood of the medium facing surface.
Figure 26:
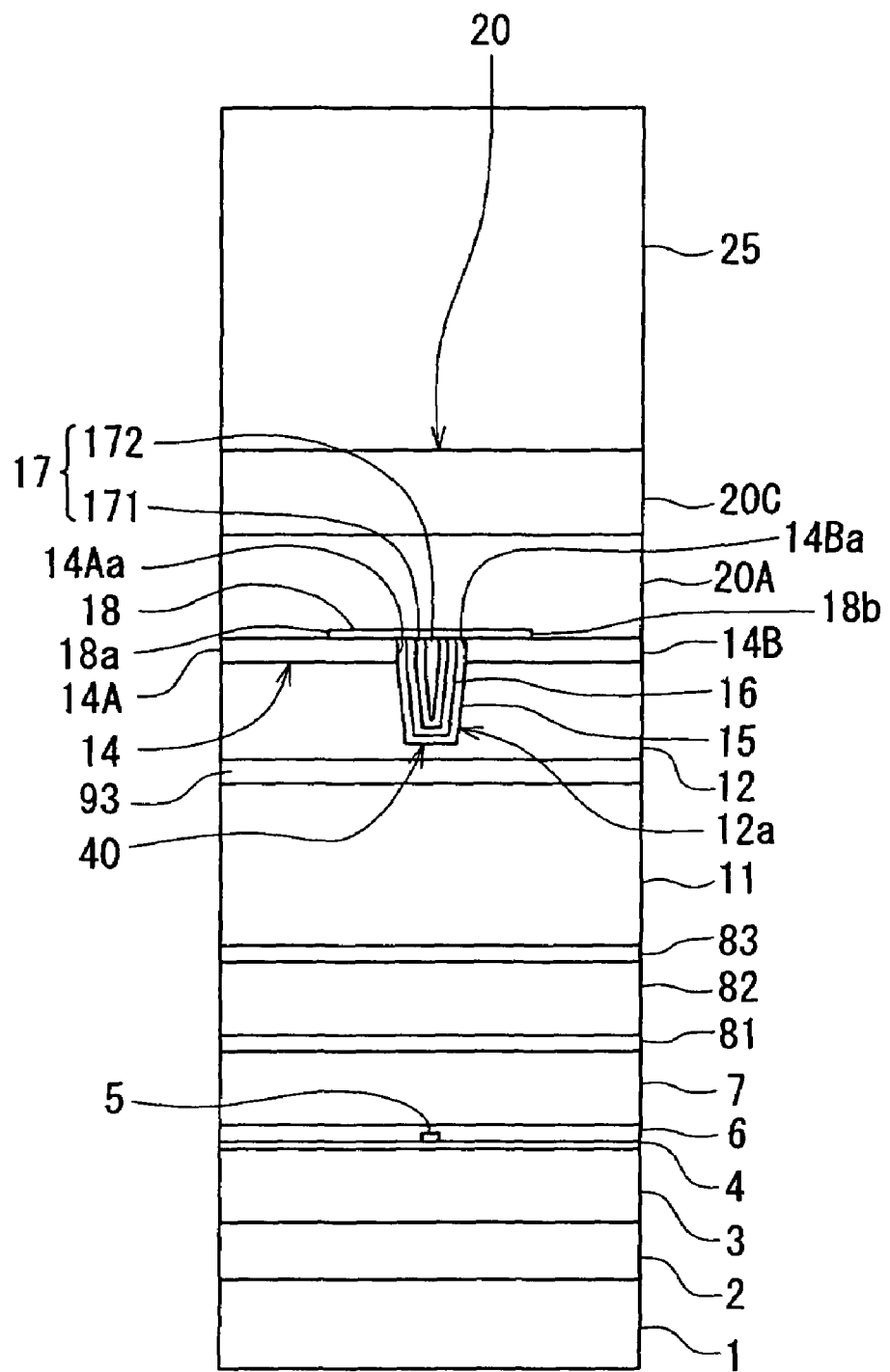
FIG. 26 is a front view of the medium facing surface of the magnetic head of the second embodiment of the invention.
Figure 27:
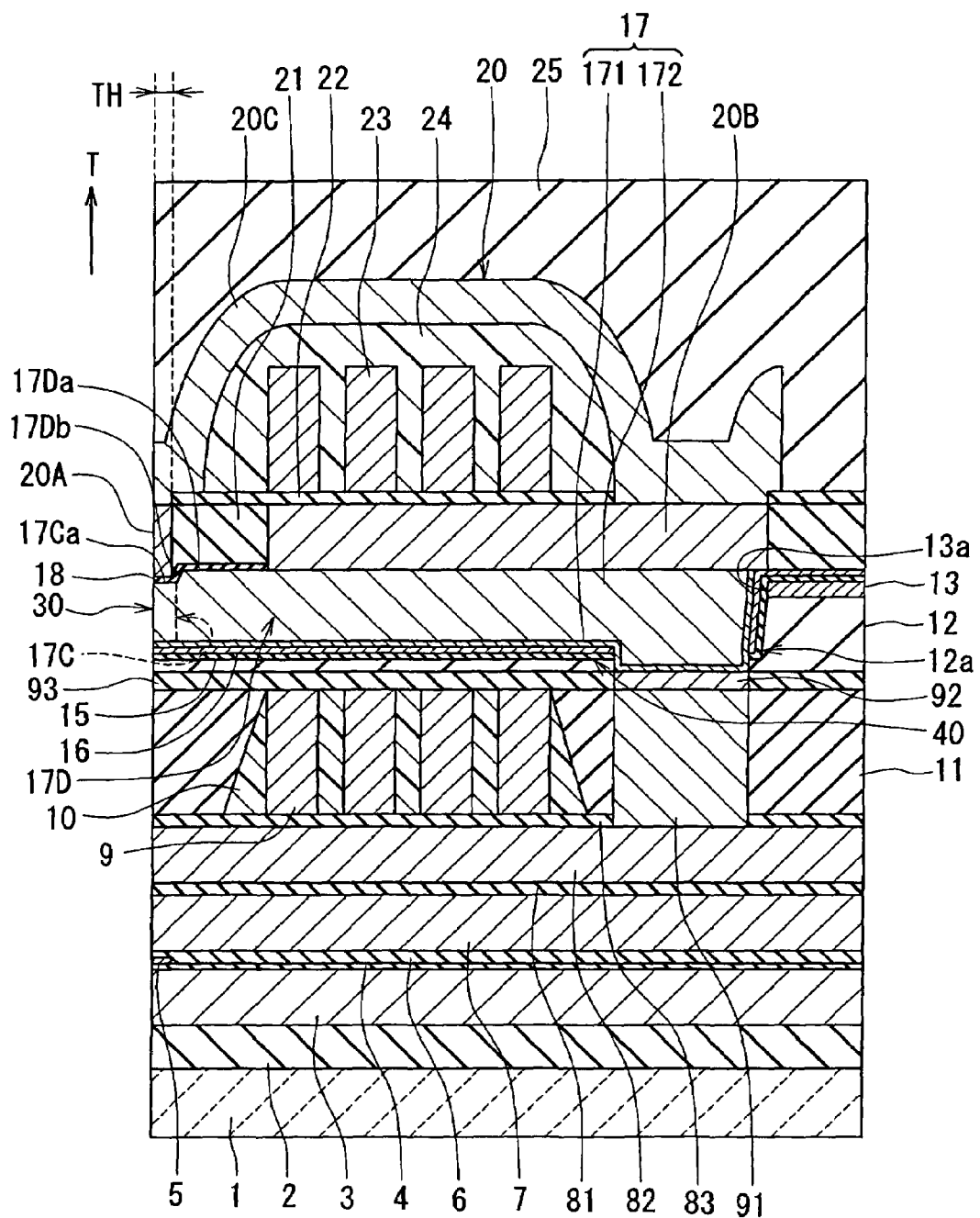
FIG. 27 is a cross-sectional view for illustrating the configuration of the magnetic head of the second embodiment of the invention.

A magnetic head and a method of manufacturing the same of a second embodiment of the invention will now be described. Reference is now made to FIG. 24 to FIG. 27 to describe the configuration of the magnetic head of the second embodiment. FIG. 24 is a perspective view illustrating portions of the pole layer and the side shield layers of the magnetic head of the second embodiment in a neighborhood of the medium facing surface. FIG. 25 is a perspective view illustrating portions of the pole layer, the side shield layers and the gap layer of the magnetic head of the embodiment in a neighborhood of the medium facing surface. FIG. 26 is a front view of the medium facing surface of the magnetic head of the embodiment. FIG. 27 is a cross-sectional view for illustrating the configuration of the magnetic head of the embodiment. FIG. 27 illustrates a cross section orthogonal to the medium facing surface and the surface of the substrate. The arrow indicated with T in FIG. 27 shows the direction of travel of the recording medium.

In the second embodiment, the insulating layer 83 has a contact hole formed in a region away from the medium facing surface 30. In the region where the contact hole is formed, a coupling layer 91 is formed on the middle magnetic layer 82. The coupling layer 91 is made of a magnetic material. The coil 9 is wound around the coupling layer 91. The insulating layer 11 is disposed around the coupling layer 91.

The coil 9, the insulating layers 10 and 11, and the coupling layer 91 have flattened top surfaces. A coupling layer 92 is disposed on the coupling layer 91. The coupling layer 92 is made of a magnetic material. An insulating layer 93 is disposed on the coil 9 and the insulating layers 10 and 11. The insulating layer 93 is made of an insulating material such as alumina. The coupling layer 92 and the insulating layer 93 have flattened top surfaces. The encasing layer 12 is disposed on the top surface of the insulating layer 93.

There is a contact hole formed at the bottom of the groove 12a of the encasing layer 12 in a region above the coupling layer 92. The pole layer 17 is connected to the coupling layer 92 through this contact hole. Therefore, the pole layer 17 is connected to the middle magnetic layer 82 through the coupling layers 91 and 92.

The pole layer 17 of the second embodiment incorporates: a first portion 17C having the end face located in the medium facing surface 30; and a second portion 17D located farther from the medium facing surface 30 than the first portion 17C and having a thickness greater than that of the first portion 17C. The thickness of the first portion 17C does not change in accordance with the distance from the medium facing surface 30.

The location of the boundary between the first portion 17C and the second portion 17D may coincide with the location of the boundary between the track width defining portion 17A and the wide portion 17B, or may be located closer to or farther from the medium facing surface 30 than the boundary between the track width defining portion 17A and the wide portion 17B. The distance from the medium facing surface 30 to the boundary between the first portion 17C and the second portion 17D falls within a range of 0.1 to 0.5 µm inclusive, for example.

A surface (a top surface) 17Ca of the first portion 17C farther from the substrate 1 is located closer to the substrate 1 than a surface (a top surface) 17Da of the second portion 17D farther from the substrate 1. The second portion 17D has a front end face 17Db that couples the surface 17Ca of the first portion 17C farther from the substrate 1 to the surface 17Da of the second portion 17D farther from the substrate 1. The front end face 17Db may be nearly orthogonal to the top surface of the substrate 1. Here, the front end face 17Db nearly orthogonal to the top surface of the substrate 1 means that the front end face 17Db forms an angle that falls within a range of 80 to 90 degrees inclusive with respect to the top surface of the substrate 1. If the front end face 17Db forms an angle that is equal to or greater than 80 degrees and smaller than 90 degrees with respect to the top surface of the substrate 1, each of the angle formed between the surfaces 17Ca and 17Db and the angle formed between the surfaces 17Da and 17Db is an obtuse angle. Alternatively, the front end face 17Db may be tilted with respect to the direction orthogonal to the top surface of the substrate 1 such that, in the region in which the front end face 17Db is located, the thickness of the pole layer 17 gradually increases as the distance from the medium facing surface 30 increases. In this case, the front end face 17Db preferably forms an angle that is equal to or greater than 30 degrees and smaller than 80 degrees with respect to the top surface of the substrate 1. The difference in level created between the surface 17Ca and the surface 17Da falls within a range of 0.1 to 0.3 µm inclusive, for example. The gap layer 18 bends along the top surface of the pole layer 17. The first layer 20A of the main shield layer 20 is located above the surface 17Ca.

Figure 28:
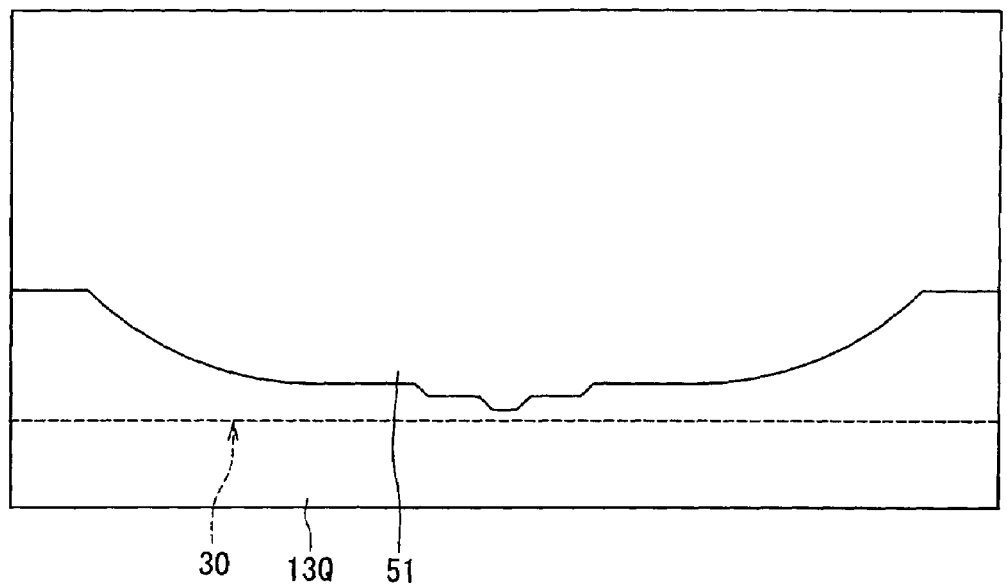
FIG. 28 is a top view of a layered structure obtained in a step of a method of manufacturing the magnetic head of the second embodiment of the invention.
Figures 33A, 33B:
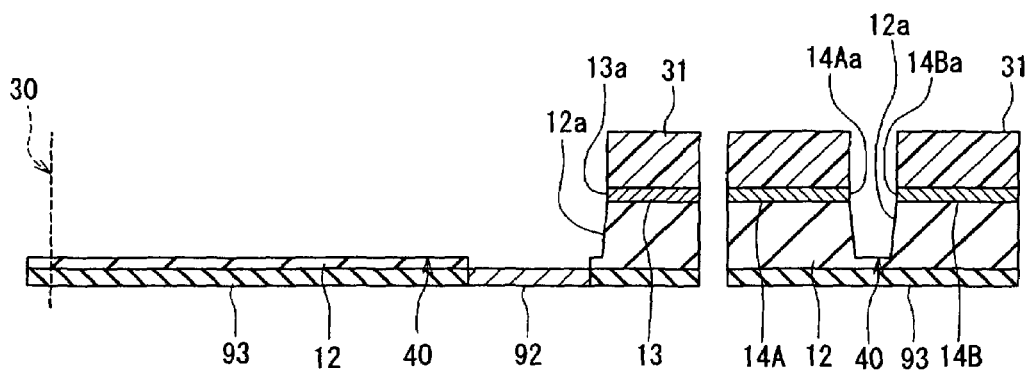
FIG. 33A and FIG. 33B are cross-sectional views of the layered structure obtained in a step that follows the step shown in FIG. 32A and FIG. 32B.
Figure 34:
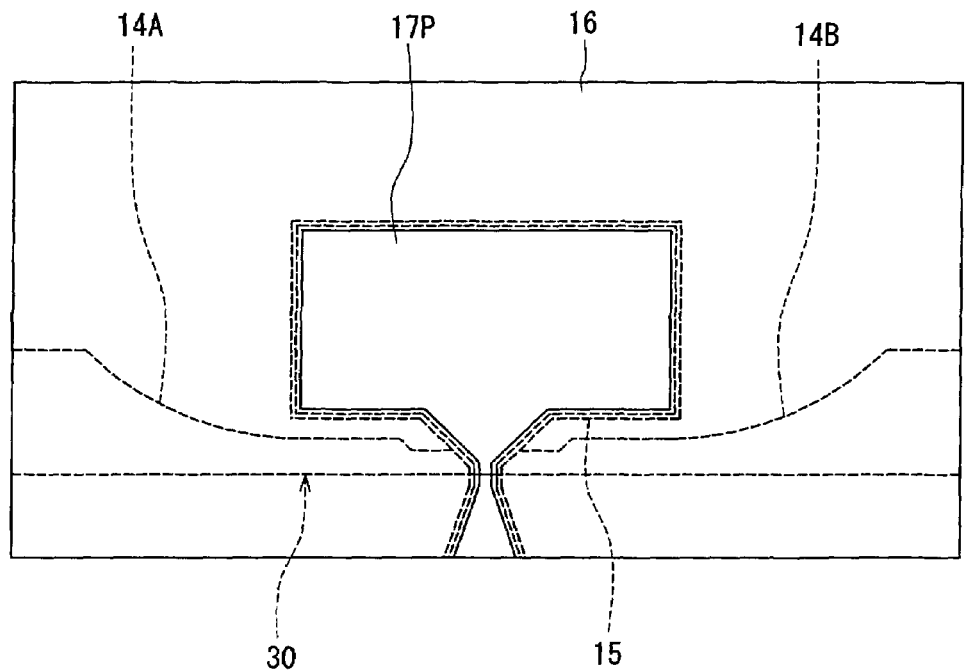
FIG. 34 is a top view of the layered structure obtained in a step that follows the step shown in FIG. 33A and FIG. 33B.
Figures 35A, 35B:
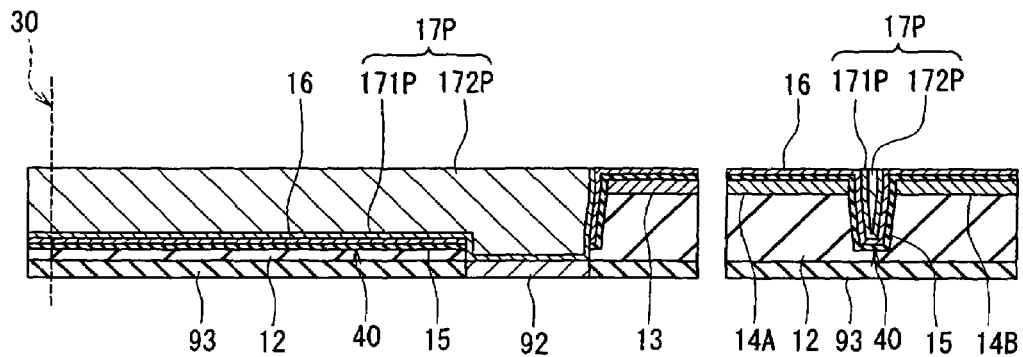
FIG. 35A and FIG. 35B are cross-sectional views of the layered structure shown in FIG. 34.
Figure 36:
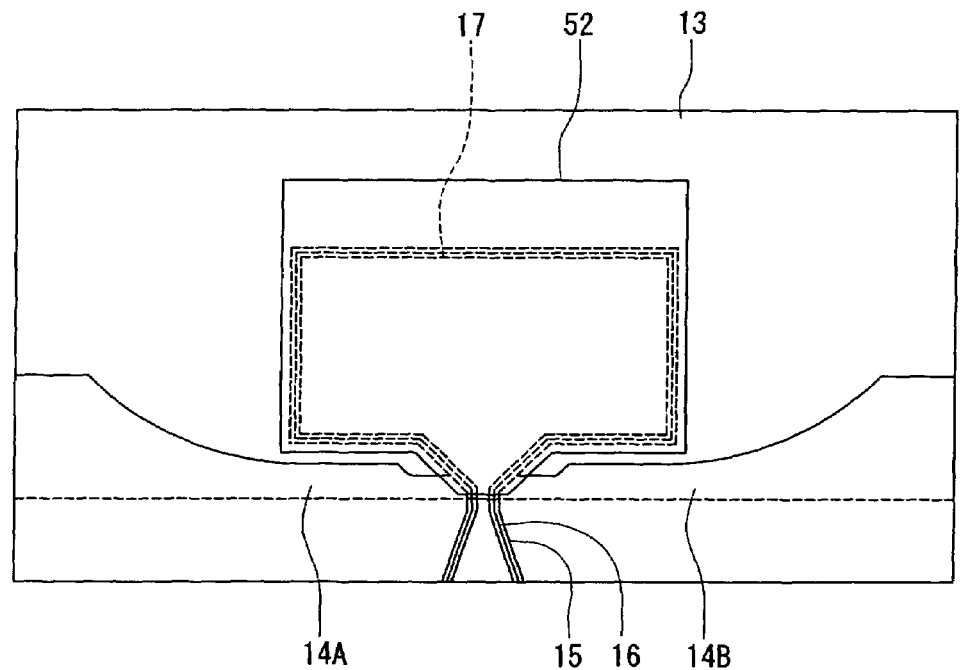
FIG. 36 is a top view of the layered structure obtained in a step that follows the step shown in FIG. 34.
Figure 39:
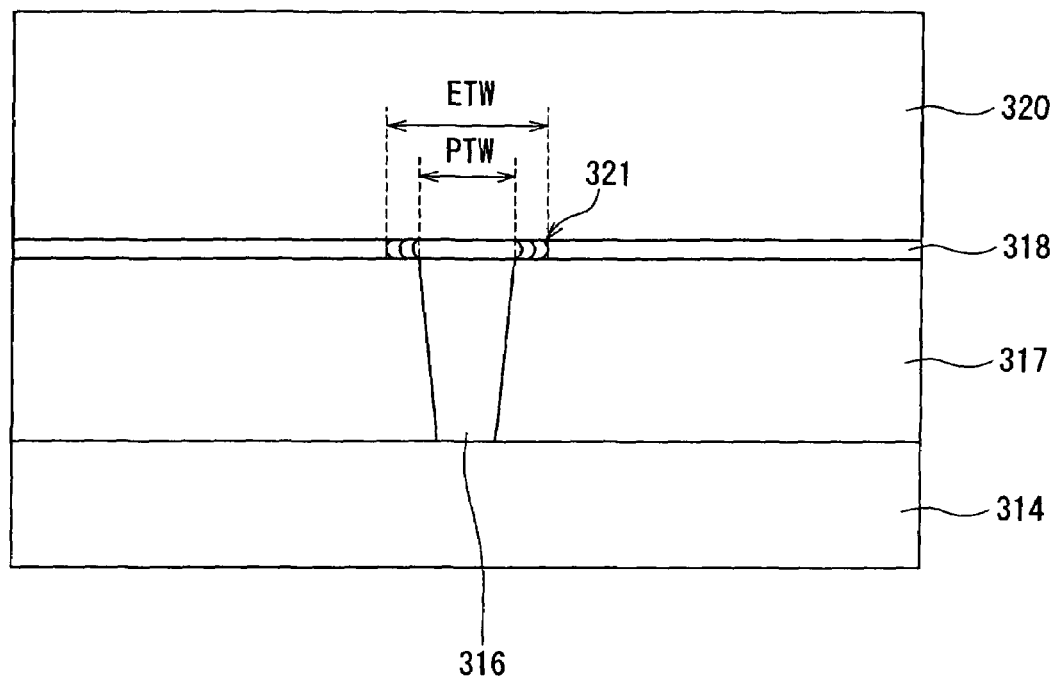
FIG. 39 is a front view illustrating a portion of the medium facing surface of an example of a shield-type head.

Reference is now made to FIG. 28 to FIG. 38B to describe a method of manufacturing the magnetic head of the second embodiment. FIG. 28, FIG. 34 and FIG. 36 are top views of layered structures obtained in manufacturing process of the magnetic head of the embodiment. In these drawings each broken line with numeral 30 indicates the location at which the medium facing surface 30 is to be formed. FIG. 29A to FIG. 33A, FIG. 35A, FIG. 37A and FIG. 38A are cross-sectional views of the layered structures orthogonal to the medium facing surface and the substrate. FIG. 29B to FIG. 33B, FIG. 35B, FIG. 37B and FIG. 38B are cross-sectional views illustrating cross sections of portions of the layered structures at the location where the medium facing surface is to be formed. The portions closer to the substrate 1 than the coupling layer 92 and the insulating layer 93 are omitted in FIG. 29A to FIG. 33A, FIG. 29B to FIG. 33B, FIG. 35A, FIG. 35B, FIG. 37A, FIG. 37B, FIG. 38A and FIG. 38B. The broken line with numeral 30 indicates the location at which the medium facing surface 30 is to be formed in each of FIG. 29A to FIG. 33A, FIG. 35A, FIG. 37A and FIG. 38A.

The method of manufacturing the magnetic head of the second embodiment includes the steps up to the step of forming the insulating layer 83 that are the same as those of the first embodiment. In the following step of the second embodiment, a contact hole is formed in the insulating layer 83. Next, the coupling layer 91 is formed on a region of the middle magnetic layer 82 where the contact hole is formed. Next, the coil 9 and the insulating layers 10 and 11 are formed on the insulating layer 83. Next, the top surfaces of the coil 9, the insulating layers 10 and 11, and the coupling layer 91 are flattened by CMP, for example.

Figures 29A, 29B:
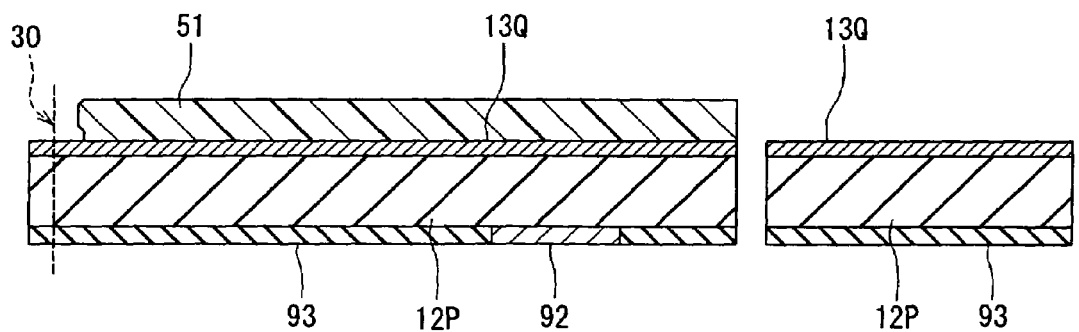
FIG. 29A and FIG. 29B are cross-sectional views of the layered structure shown in FIG. 28.

FIG. 28, FIG. 29A and FIG. 29B illustrate the following step. In the step, first, the coupling layer 92 is formed on the coupling layer 91. Next, the nonmagnetic layer 12P is formed to cover the entire top surface of the layered structure. The groove 12a will be formed in the nonmagnetic layer 12P later and the nonmagnetic layer 12P will be thereby formed into the encasing layer 12. Next, a film 13Q to be patterned having a thickness of 50 to 100 nm, for example, is formed by sputtering, for example, on the nonmagnetic layer 12P. The film 13Q will be patterned later to be formed into the nonmagnetic metal film 13P. Next, an etching mask 51 is formed on the film 13Q. The etching mask 51 may have an undercut, for example. Such an etching mask 51 having the undercut may be formed by exposing and developing a two-layer resist layer made up of a lower layer made of a material soluble in a developer and a photoresist layer disposed on the lower layer.

FIG. 30A and FIG. 30B illustrate the following step. In the step, the film 13Q is selectively etched using the etching mask 51. This etching is performed by ion beam etching, for example. Through this etching, the film 13Q is patterned to be formed into the nonmagnetic metal film 13P.

FIG. 31A and FIG. 31B illustrate the following step. In the step, with the etching mask 51 left unremoved, the magnetic film 14P that will be the side shield layers 14A and 14B later is formed on the etching mask 51 and on part of the top surface of the nonmagnetic layer 12P where the etching mask 51 is not disposed. The magnetic film 14P is formed by sputtering, for example. The magnetic film 14P is formed such that the thickness thereof falls within a range of 50 to 100 nm inclusive, for example, and that the thickness is nearly equal to the thickness of the nonmagnetic metal film 13P. Next, the etching mask 51 is removed.

FIG. 32A and FIG. 32B illustrate the following step. In the step, the top surfaces of the nonmagnetic metal film 13P and the magnetic film 14P are slightly polished by CMP, for example, to flatten the top surfaces of the nonmagnetic metal film 13P and the magnetic film 14P.

FIG. 33A and FIG. 33B illustrate the following step. In the step, first, the mask 31 is formed on the nonmagnetic metal film 13P and the magnetic film 14P as in the first embodiment. The mask 31 has an opening having a shape corresponding to the encasing section 40. Next, the nonmagnetic metal film 13P and the magnetic film 14P are selectively etched using the mask 31. Openings each having a shape corresponding to the opening of the mask 31 are thereby formed in the nonmagnetic metal film 13P and the magnetic film 14P. As a result, the nonmagnetic metal film 13P is formed into the nonmagnetic metal layer 13 having the sidewall 13a, and the magnetic film 14P is formed into the side shield layers 14A and 14B having the sidewalls 14Aa and 14Ba, respectively. The etching of the nonmagnetic metal film 13P and the magnetic film 14P is performed so that the sidewalls 13a, 14Aa and 14Ba formed by the etching are orthogonal to the top surface of the substrate 1.

Next, as in the first embodiment, the nonmagnetic layer 12P is selectively etched using the nonmagnetic metal layer 13 and the side shield layers 14A and 14B as masks. As a result, the groove 12a is formed in the nonmagnetic layer 12P, and the nonmagnetic layer 12P is thereby formed into the encasing layer 12. In addition, the encasing section 40 is formed of the groove 12a of the encasing layer 12, the sidewall 13a of the nonmagnetic metal layer 13, and the sidewalls 14Aa and 14Ba of the side shield layers 14A and 14B. Furthermore, a contact hole is formed in the encasing layer 12 by selectively etching a portion of the bottom of the groove 12a located above the coupling layer 92. Next, the mask 31 is removed.

FIG. 34, FIG. 35A and FIG. 35B illustrate the following step. In the step, first, as in the first embodiment, the nonmagnetic film 15 and the polishing stopper layer 16 are formed one by one on the entire top surface of the layered structure. The nonmagnetic film 15 and the polishing stopper layer 16 are formed in the encasing section 40, too. Next, contact holes are formed in the nonmagnetic film 15 and the polishing stopper layer 16 by selectively etching portions of the nonmagnetic film 15 and the polishing stopper layer 16 located above the coupling layer 92.

Next, as in the first embodiment, the first magnetic layer 171P and the second magnetic layer 172P are formed one by one on the entire top surface of the layered structure. Next, as in the first embodiment, a coating layer not shown made of alumina, for example, is formed on the entire top surface of the layered structure. Next, the coating layer, the second magnetic layer 172P and the first magnetic layer 171P are polished by CMP, for example, so that the polishing stopper layer 16 is exposed, and the top surfaces of the polishing stopper layer 16, the first magnetic layer 171P and the second magnetic layer 172P are thereby flattened. In FIG. 34, FIG. 35A and FIG. 35B, a layered structure made up of the first magnetic layer 171P and the second magnetic layer 172P is indicated with 17P. The layered structure 17P is connected to the coupling layer 92 through the contact holes formed in the encasing layer 12, the nonmagnetic film 15 and the polishing stopper layer 16.

FIG. 36, FIG. 37A and FIG. 37B illustrate the following step. In the step, first, a photoresist layer having a thickness of 1.0 μm, for example, is formed on the entire top surface of the layered structure. The photoresist layer is then patterned to form a mask 52 for etching portions of the magnetic layers 171P and 172P. The distance between the medium facing surface 30 and an end of the mask 52 closer to the medium facing surface 30 falls within a range of 0.05 to 0.3 μm inclusive, for example. The mask 52 is located above the top surfaces of the magnetic layers 171P and 172P except the regions in which the surface 17Ca and the front end face 17Db will be formed. Next, portions of the magnetic layers 171P and 172P are etched by ion beam etching, for example, using the mask 52. As a result, the surfaces 17Ca and 17Da and the front end face 17Db are formed in the top surfaces of the magnetic layers 171P and 172P, and the magnetic layers 171P and 172P are thereby formed into the first layer 171 and the second layer 172, respectively. When the portions of the magnetic layers 171P and 172P are etched by ion beam etching, the direction in which ion beams move should form an angle that falls within a range of 40 to 55 degrees inclusive, for example, with respect to the direction orthogonal to the top surface of the substrate 1. It is thereby possible that the front end face 17Db forms an angle that falls within a range of 80 to 90 degrees inclusive with respect to the top surface of the substrate 1. In addition, this etching is performed such that a side of the end face of the pole layer 17 located in the medium facing surface 30, the side being farthest from the substrate 1, is disposed at a height that falls within the range between the height at which the top surface of each of the side shield layers 14A and 14B as initially formed is located and the height at which the bottom surface thereof is located. Therefore, the side shield layers 14A and 14B serve as the reference that indicates the level at which this etching is stopped. By etching the portions of the magnetic layers 171P and 172P in the manner described above, each of the track width and the thickness of the pole layer 17 taken in the medium facing surface 30 is controlled to be nearly uniform. It is thereby possible to control the thickness of the pole layer 17 and the track width with precision. Next, the mask 52 is removed.

FIG. 38A and FIG. 38B illustrate the following step. In the step, first, the gap layer 18 is formed on the entire top surface of the layered structure as in the first embodiment. The steps that follow are the same as those of the first embodiment. That is, first, the gap layer 18 is selectively etched to pattern the gap layer 18. As a result, an opening is formed in a region of the gap layer 18 where the yoke layer 20B will be disposed later, and two contact holes 18c for exposing the top surfaces of the two side shield layers 14A and 14B are formed. Next, the first layer 20A is formed on the gap layer 18, and the yoke layer 20B is formed on the pole layer 17. Next, the nonmagnetic layer 21 is formed on the entire top surface of the layered structure. Next, the nonmagnetic layer 21 is polished so that the first layer 20A and the yoke layer 20B are exposed, and the top surfaces of the first layer 20A, the yoke layer 20B and the nonmagnetic layer 21 are flattened.

Next, as shown in FIG. 26 and FIG. 27, the insulating layer 22 is formed on regions of the top surfaces of the yoke layer 20B and the nonmagnetic layer 21 in which the coil 23 will be disposed. Next, the coil 23 is formed such that at least part of the coil 23 is disposed on the insulating layer 22. The insulating layer 24 is formed to cover the coil 23. Next, the second layer 20C is formed. Next, the protection layer 25 is formed to cover the entire top surface of the layered structure. Wiring and terminals are then formed on the protection layer 25, the substrate is cut into sliders, and the steps including polishing of the medium facing surface 30 and fabrication of flying rails are performed. The magnetic head is thus completed.

According to the embodiment, the second portion 17D of the pole layer 17 has a thickness greater than that of the first portion 17C. As a result, it is possible to introduce a magnetic flux of great magnitude to the medium facing surface 30 through the pole layer 17 while the thickness of the pole layer 17 taken in the medium facing surface 30 is reduced. It is thereby possible to implement a sufficient overwrite property.

Flux leakage from the pole layer 17 is likely to occur in the portion of the pole layer 17 where the thickness changes, that is, in a neighborhood of the front end face 17Db. If the flux leaking from this portion reaches the medium facing surface 30 and further leaks to the outside from the medium facing surface 30, the effective track width will increase and/or the problems resulting from the skew will occur. According to the embodiment, the main shield layer 20 has the portion located between the front end face 17Db and the medium facing surface 30 in the region closer to the substrate 1 than the surface 17Da of the second portion 17D of the pole layer 17 farther from the substrate 1. Therefore, the leakage flux from the portion of the pole layer 17 in which the thickness changes is taken in by the main shield layer 20. It is thereby possible that the flux leaking from somewhere in the middle of the pole layer 17 is prevented from leaking to the outside from the medium facing surface 30.

According to the embodiment, the magnetic head comprises the yoke layer 20B that touches the surface of the second portion 17D of the pole layer 17 farther from the substrate 1. An end of the yoke layer 20B closer to the medium facing surface 30 is located farther from the medium facing surface 30 than the location of the boundary between the surfaces 17Da and 17Db of the pole layer 17. Therefore, where consideration is given to a magnetic layer made up of a combination of the pole layer 17 and the yoke layer 20B, the thickness of this magnetic layer is reduced by two steps as the distance from the medium facing surface 30 decreases. As a result, it is possible to introduce a magnetic flux of great magnitude to the medium facing surface 30 while preventing saturation of flux halfway through the magnetic layer.

According to the embodiment, the top surface of the pole layer 17 bends in the neighborhood of the medium facing surface 30. It is thereby possible to suppress generation of residual magnetization in the direction orthogonal to the medium facing surface 30 in a portion of the pole layer 17 near the medium facing surface 30 after writing is performed. As a result, it is possible to suppress the occurrence of a phenomenon in which data stored on the recording medium is erased because of the residual magnetization in the pole layer 17 after writing is performed.

The remainder of configuration, function and effects of the second embodiment are similar to those of the first embodiment including the modification example.

The present invention is not limited to the foregoing embodiments but may be practiced in still other ways. For example, a coil wound around the pole layer 17 in a helical manner may be provided in each of the embodiments in place of the flat-whorl-shaped coils 9 and 23.

While the magnetic head disclosed in the embodiments has such a configuration that the read head is formed on the base body and the write head is stacked on the read head, it is also possible that the read head is stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:
    a medium facing surface that faces toward a recording medium;
    a coil for generating a magnetic field corresponding to data to be written on the recording medium;
    a pole layer allowing a magnetic flux corresponding to the magnetic field generated by the coil to pass therethrough, and generating a write magnetic field for writing the data on the recording medium by means of a perpendicular magnetic recording system;
    a main shield layer made of a magnetic material, having an end face disposed in the medium facing surface, and having a portion that is away from the medium facing surface and coupled to the pole layer;
    a gap layer made of a nonmagnetic material, the gap layer provided between the pole layer and the main shield layer, and having an end face disposed in the medium facing surface;
    an encasing layer made of a nonmagnetic material and having a groove that opens in a top surface thereof, the pole layer having an end face located in the medium facing surface and a top face that is perpendicular to the end face of the pole layer and opposite the encasing layer;
    a nonmagnetic metal layer made of a nonmagnetic metal material, the nonmagnetic metal layer having a sidewall located directly above an edge of the groove, an upper surface that is perpendicular to the sidewall and a lower surface, the lower surface of the nonmagnetic metal layer being opposite the upper surface of the nonmagnetic metal layer and disposed on the top surface of the encasing layer, the upper surface of the nonmagnetic metal layer being even with the top face of the pole layer, the nonmagnetic metal layer being disposed on a region of the top surface of the encasing layer away from the medium facing surface;
    two side shield layers made of a magnetic metal material that have sidewalls located directly above the edge of the groove and that are disposed adjacent to the nonmagnetic metal layer on regions of the top surface of the encasing layer closer to the medium facing surface than the nonmagnetic metal layer, the two side shield layers having two end faces located in the medium facing surface on both sides of the end face of the pole layer, the both sides being opposed to each other in a direction of track width;
    an encasing section that is formed of the groove, the sidewall of the nonmagnetic metal layer, and the sidewalls of the side shield layers and that accommodates at least part of the pole layer; and
    a nonmagnetic film made of a nonmagnetic material and disposed between the pole layer and the sidewalls of the side shield layers.

2. The magnetic head according to claim 1, wherein the end face of the pole layer located in the medium facing surface includes a portion having a width that decreases as a distance from the gap layer increases.

3. The magnetic head according to claim 1, wherein:
the end face of the pole layer located in the medium facing surface incorporates a first region and a second region, the second region being disposed between the first region and the end face of the gap layer and connected to the first region;
the first region has a width that decreases as a distance from the gap layer increases;
the second region has a uniform width that defines the track width;
the width of the first region and that of the second region are equal at a boundary between the first and second regions; and,
in the medium facing surface, the end faces of the side shield layers are located on both sides of the second region, the sides being opposed to each other in the direction of track width.

4. The magnetic head according to claim 1, wherein, in the medium facing surface, both ends of the end face of the gap layer opposed to each other in the direction of track width are located at positions outside the sidewalls of the side shield layers along the direction of track width.

5. The magnetic head according to claim 1, wherein the side shield layers have a saturation flux density lower than that of the pole layer.

6. The magnetic head according to claim 1, wherein the side shield layers are connected to the main shield layer.

7. The magnetic head according to claim 1, wherein the side shield layers are not connected to the main shield layer.

8. The magnetic head according to claim 1, further comprising:
a substrate on which the encasing layer, the nonmagnetic metal layer, the side shield layers, the nonmagnetic film, the pole layer, the gap layer, the main shield layer, and the coil are stacked, wherein:
the pole layer incorporates:
a first portion having the end face located in the medium facing surface; and a second portion located farther from the medium facing surface than the first portion and having a thickness greater than that of the first portion, and
a surface of the first portion farther from the substrate is located closer to the substrate than a surface of the second portion farther from the substrate.

9. A method of manufacturing a magnetic head for perpendicular magnetic recording, the magnetic head comprising:
a medium facing surface that faces toward a recording medium;
a coil for generating a magnetic field corresponding to data to be written on the recording medium;
a pole layer allowing a magnetic flux corresponding to the magnetic field generated by the coil to pass therethrough, and generating a write magnetic field for writing the data on the recording medium by means of a perpendicular magnetic recording system;
a main shield layer made of a magnetic material, the main shield layer having an end face disposed in the medium facing surface, and the main shield layer having a portion that is away from the medium facing surface and coupled to the pole layer;
a gap layer made of a nonmagnetic material, the gap layer provided between the pole layer and the main shield layer, and the gap layer having an end face disposed in the medium facing surface;
an encasing layer made of a nonmagnetic material and having a groove that opens in a top surface thereof;
the pole layer having an end face located in the medium facing surface and a top face that is perpendicular to the end face of the pole layer and opposite the encasing layer;
a nonmagnetic metal layer made of a nonmagnetic metal material, the nonmagnetic metal layer having a sidewall located directly above an edge of the groove, an upper surface that is perpendicular to the sidewall and a lower surface, the lower surface of the nonmagnetic metal layer being opposite the upper surface of the nonmagnetic metal layer and disposed on the top surface of the encasing layer, the upper surface of the nonmagnetic metal layer being even with the top face of the pole layer, the nonmagnetic metal layer being disposed on a region of the top surface of the encasing layer away from the medium facing surface;
two side shield layers made of a magnetic metal material that have sidewalls located directly above the edge of the groove and that are disposed adjacent to the nonmagnetic metal layer on regions of the top surface of the encasing layer closer to the medium facing surface than the nonmagnetic metal layer;
an encasing section that is formed of the groove, the sidewall of the nonmagnetic metal layer, and the sidewalls of the side shield layers and that accommodates at least part of the pole layer; and
a nonmagnetic film made of a nonmagnetic material and disposed between the pole layer and the sidewalls of the side shield layers, wherein
the two side shield layers have two end faces located in the medium facing surface on both sides of the end face of the pole layer, the both sides being opposed to each other in a direction of track width, the method comprising the steps of:
forming a nonmagnetic layer that will be the encasing layer later by forming the groove therein;
forming a nonmagnetic metal film that will be the nonmagnetic metal layer later on a portion of a top surface of the nonmagnetic layer;
forming a magnetic film that will be the two side shield layers later on portions of the top surface of the nonmagnetic layer where the nonmagnetic metal film is not formed, the step of forming the magnetic film being performed after the step of forming the nonmagnetic metal film;
flattening top surfaces of the nonmagnetic metal film and the magnetic film;
selectively etching the nonmagnetic metal film and the magnetic film so that the nonmagnetic metal film is formed into the nonmagnetic metal layer and the magnetic film is formed into the two side shield layers;
selectively etching the nonmagnetic layer using the nonmagnetic metal layer and the side shield layers as masks, so that the groove is formed in the nonmagnetic layer and the nonmagnetic layer is thereby formed into the encasing layer, and so that the encasing section is formed of the groove, the sidewall of the nonmagnetic metal layer and the sidewalls of the side shield layers;
forming the nonmagnetic film after the step of selectively etching the nonmagnetic layer;
forming the pole layer so that the at least part of the pole layer is placed in the encasing section and that the nonmagnetic film is disposed between the pole layer and the sidewalls of the side shield layers;
forming the gap layer on the pole layer;
forming the main shield layer on the gap layer; and
forming the coil.

10. The method according to claim 9, wherein, in the step of flattening the top surfaces of the nonmagnetic metal film and the magnetic film, the top surface of the magnetic film is polished such that the top surface of the nonmagnetic metal film is a level at which the polishing is stopped.

11. The method according to claim 10, wherein the polishing is chemical mechanical polishing.

12. The method according to claim 9, wherein, in the step of forming the magnetic film, the magnetic film is formed on a top surface of the nonmagnetic metal film and a portion of the top surface of the nonmagnetic layer where the nonmagnetic metal film is not formed.

13. The method according to claim 9, wherein:
the step of forming the nonmagnetic metal film includes the steps of:
forming a film to be patterned that will be patterned later to be the nonmagnetic metal film;
forming an etching mask on the film to be patterned; and
selectively etching the film to be patterned using the etching mask so that the film to be patterned is formed into the nonmagnetic metal film; and
the step of forming the magnetic film includes the steps of:
forming the magnetic film while leaving the etching mask unremoved; and
removing the etching mask after the magnetic film is formed.

14. The method according to claim 9, wherein, in the step of forming the nonmagnetic film, the nonmagnetic film is formed such that the nonmagnetic film is disposed between the pole layer, and each of the encasing layer, the nonmagnetic metal layer and the side shield layers.

15. The method according to claim 14, wherein the nonmagnetic film is formed by chemical vapor deposition in which formation of a single atomic layer is repeated.

16. The method according to claim 9, wherein the end face of the pole layer located in the medium facing surface includes a portion having a width that decreases as a distance from the gap layer increases.

17. The method according to claim 9, wherein:
the end face of the pole layer located in the medium facing surface incorporates a first region and a second region disposed between the first region and the end face of the gap layer and connected to the first region;
the first region has a width that decreases as a distance from the gap layer increases;
the second region has a uniform width that defines the track width;
the width of the first region and that of the second region are equal at a boundary between the first and second regions; and,
in the medium facing surface, the end faces of the side shield layers are located on both sides of the second region, the sides being opposed to each other in the direction of track width.

18. The method according to claim 9, wherein, in the medium facing surface, both ends of the end face of the gap layer opposed to each other in the direction of track width are located at positions outside the sidewalls of the side shield layers along the direction of track width.

19. The method according to claim 9, wherein the side shield layers have a saturation flux density lower than that of the pole layer.

20. The method according to claim 9, wherein the side shield layers are connected to the main shield layer.

21. The method according to claim 9, wherein the side shield layers are not connected to the main shield layer.

22. The method according to claim 9, the magnetic head further comprising a substrate on which the encasing layer, the nonmagnetic metal layer, the side shield layers, the nonmagnetic film, the pole layer, the gap layer, the main shield layer and the coil are stacked, wherein:
the pole layer incorporates:
a first portion having the end face located in the medium facing surface; and
a second portion located farther from the medium facing surface than the first portion and having a thickness greater than that of the first portion; and
a surface of the first portion farther from the substrate is located closer to the substrate than a surface of the second portion farther from the substrate.

* * * * *